United States Patent
Zou

(10) Patent No.: US 9,565,179 B2
(45) Date of Patent: Feb. 7, 2017

(54) METHOD AND SYSTEM FOR FACILITATING COLLABORATION ACROSS MULTIPLE PLATFORMS

(71) Applicant: Tencent Technology (Shenzhen) Company Limited, Shenzhen (CN)

(72) Inventor: Jianbo Zou, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/186,108

(22) Filed: Jun. 17, 2016

(65) Prior Publication Data

US 2016/0294813 A1    Oct. 6, 2016

Related U.S. Application Data

(63) Continuation of application No. PCT/CN2015/070232, filed on Jan. 6, 2015.

(30) Foreign Application Priority Data

Jan. 10, 2014    (CN) .......................... 2014 1 0011347

(51) Int. Cl.
H04L 29/06    (2006.01)

(52) U.S. Cl.
CPC ......... *H04L 63/0815* (2013.01); *H04L 63/083* (2013.01)

(58) Field of Classification Search
None
See application file for complete search history.

(56) References Cited

U.S. PATENT DOCUMENTS

| 8,424,069 B2 | 4/2013 | Weatherston |
| 2003/0084101 A1* | 5/2003 | Wong .................... G06Q 10/10 709/204 |

(Continued)

FOREIGN PATENT DOCUMENTS

| CN | 101719238 A | 6/2010 |
| CN | 101719880 A | 6/2010 |

(Continued)

OTHER PUBLICATIONS

Tencent Technology, ISRWO, PCT/CN2015/070232, Apr. 13, 2015, 8 pgs.

(Continued)

*Primary Examiner* — Fatoumata Traore
(74) *Attorney, Agent, or Firm* — Morgan, Lewis & Bockius LLP

(57) ABSTRACT

A method and system for facilitating collaboration across a plurality of platforms are disclosed. A server with one or more processors and memory performs an identity authentication process to validate a user to access a super account, where the super account is bound to a plurality of sub-accounts, and where each of the plurality of sub-accounts corresponds to a distinct platform. In accordance with a determination that the authentication process is successful, the server queries sub-servers corresponding to the plurality of sub-accounts for respective usage rights of each of the plurality of sub-accounts. The server transmits, to the user, one or more tokens identifying the respective usage rights of each of the plurality of sub-accounts and generates a user interface including affordances based at least in part on the usage rights of each of the plurality of sub-accounts.

17 Claims, 18 Drawing Sheets

(56) References Cited

U.S. PATENT DOCUMENTS

| | | | |
|---|---|---|---|
| 2007/0040015 A1* | 2/2007 | Carlson | G06Q 40/00 235/379 |
| 2011/0283259 A1* | 11/2011 | Lawson | G06F 8/61 717/121 |
| 2012/0208495 A1* | 8/2012 | Lawson | H04M 15/8278 455/406 |
| 2012/0227094 A1 | 9/2012 | Begen et al. | |
| 2013/0318591 A1 | 11/2013 | Zhu et al. | |

FOREIGN PATENT DOCUMENTS

| | | |
|---|---|---|
| CN | 102891832 A | 1/2013 |
| CN | 103248699 A | 8/2013 |
| CN | 103259663 A | 8/2013 |

OTHER PUBLICATIONS

Tencent Technology, IPRP, PCT/CN2015/070232, Jul. 12, 2016, 6 pgs.

\* cited by examiner

METHOD AND SYSTEM FOR FACILITATING COLLABORATION ACROSS MULTIPLE PLATFORMS

PRIORITY CLAIM AND RELATED APPLICATION

This application is a continuation application of PCT Patent Application No. PCT/CN2015/070232, entitled "METHOD AND SYSTEM FOR FACILITATING COLLABORATION ACROSS MULTIPLE PLATFORMS" filed on Jan. 6, 2015, which claims priority to Chinese Patent Application No. 201410011347.6, entitled "Multi-Account Verification Method, Apparatus and System" filed on Jan. 10, 2014, both of which are incorporated by reference in their entirety.

TECHNICAL FIELD

The present disclosure relates to the field of Internet technologies, and in particular, to a method and system for facilitating collaboration across multiple platforms.

BACKGROUND

Along with the diversification of Internet applications, the types of applications provided by the same service provider for users or developers are more and more abundant. For example, the applications provided by the service provider for the developers may include web applications, mobile applications, hardware applications, public account application, and the like.

Currently, each application usually has its own account authentication process. For example, the developer may develop in a public platform by utilizing a public account, and the developer may also develop in a web development platform by further utilizing an instant messaging account, and so on. When the developer develops an application, he/she needs to firstly find an application platform corresponding to the application, secondly register an account in the application platform, and, then, use and manage the resources of the application platform from within the registered account. If the developer develops different applications, the developer needs to switch to different application platforms by using different accounts, which requires the developer to undergo an authentication process each time he/she logs into a different account. Therefore, the developer needs to respectively carry out the same or similar authentication process in each application platform when simultaneously developing in the plurality of application platforms.

SUMMARY

At least the following problem(s) exist in the prior art: In order to log into accounts corresponding to each application platform, the application platforms require a same or similar identification authentication process with a set of complex operations. Thus, the developer needs to repeatedly carry out the same or similar set of identification authentication operations in each application platform, and a server of each application platform needs to independently configure a set of resources for realizing the identification authentication mechanism. Therefore, the above-mentioned account verification method has the disadvantages that the process is complex, the efficiency is low, too many operations and too much time of the developer are wasted, and the server of each application platform has to wastefully configure the set of resources for realizing the same or similar identification authentication mechanism.

In some embodiments, a method of facilitating collaboration across a plurality of platforms is performed at a server (e.g., server system 108, FIGS. 1-2) with one or more processors and memory. The method includes performing an identity authentication process to validate a user to access a super account, where the super account is bound to a plurality of sub-accounts, and where each of the plurality of sub-accounts corresponds to a distinct platform. In accordance with a determination that the authentication process is successful, the method includes querying sub-servers corresponding to the plurality of sub-accounts for respective usage rights of each of the plurality of sub-accounts. The method includes transmitting, to the user, one or more tokens identifying the respective usage rights of each of the plurality of sub-accounts and generating a user interface including affordances based at least in part on the usage rights of each of the plurality of sub-accounts.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
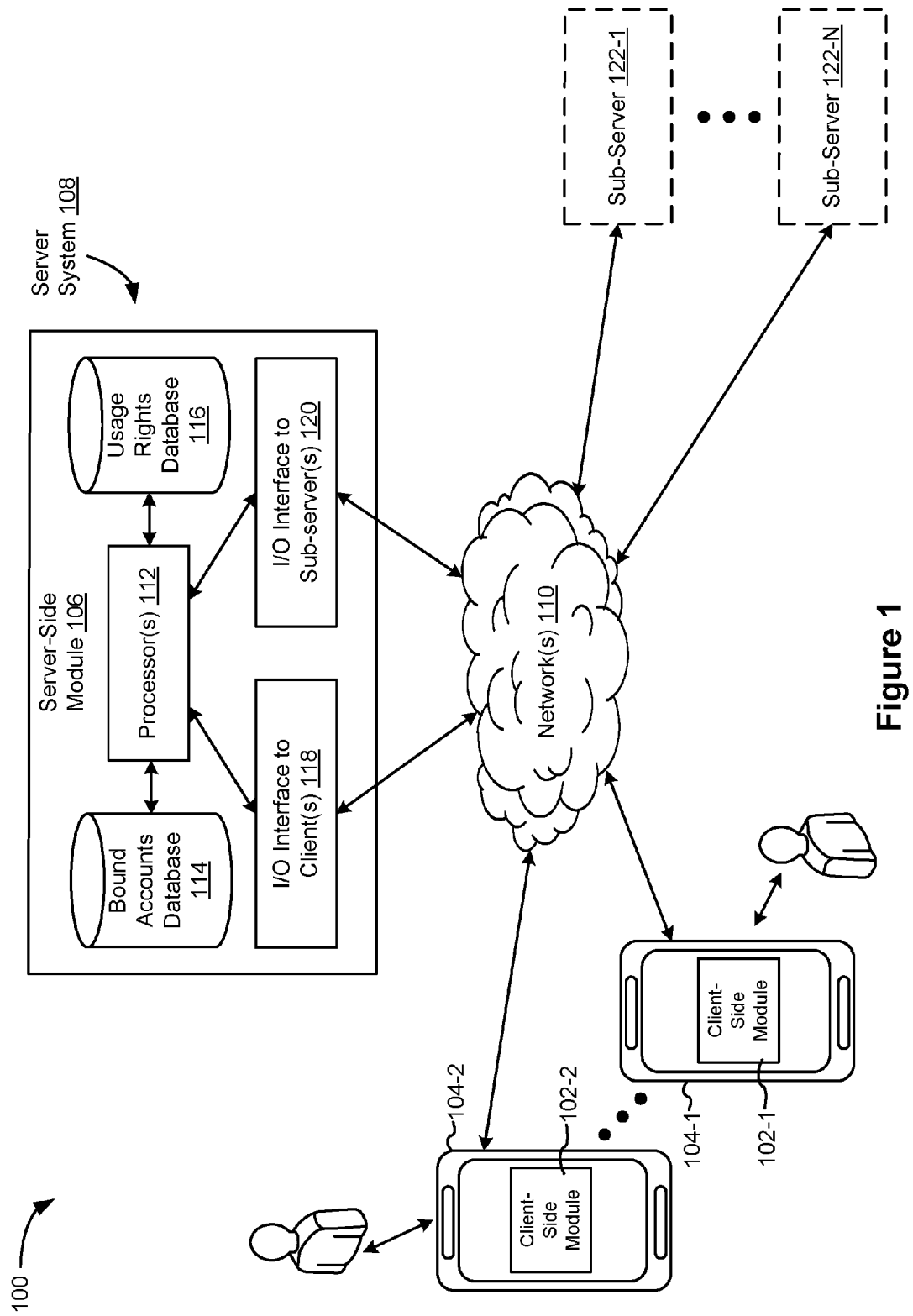
FIG. 1 is a block diagram of a server-client environment in accordance with some embodiments.

As shown in FIG. 1, data processing for a unified account access application is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the unified account access application and communications with server-side module 106. Server-side module 106 provides server-side functionalities for the unified account access application for any number of client modules 102 each residing on a respective client device 104.

In some embodiments, server-side module 106 includes one or more processors 112, bound accounts database 114, usage rights database 116, an I/O interface to one or more clients 118, and an I/O interface to one or more sub-servers 120. I/O interface to one or more clients 118 facilitates the client-facing input and output processing for server-side module 106. In some embodiments, processor(s) 112 provide access to multiple sub-accounts on multiple platforms to registered super accounts of the unified account access application. Bound accounts database 114 stores credentials for sub-account(s) bound to each super account, and usage rights database 116 stores, for each super account, the usage rights for each bound sub-account. I/O interface to one or more sub-servers 120 facilitates communications with one or more sub-servers 122, where the one or more sub-servers 122 provide services (e.g., application hosting, web hosting, or cloud-based services such as video and/or image hosting and storage websites) corresponding to the sub-accounts.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point of sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of server system 108, the corresponding actions performed by client device 104 would be apparent to ones skilled in the art without any creative efforts. Furthermore, some aspects of the present technology may be performed by server system 108, client device 104, or server system 108 and client device 104 cooperatively.

Figure 2:
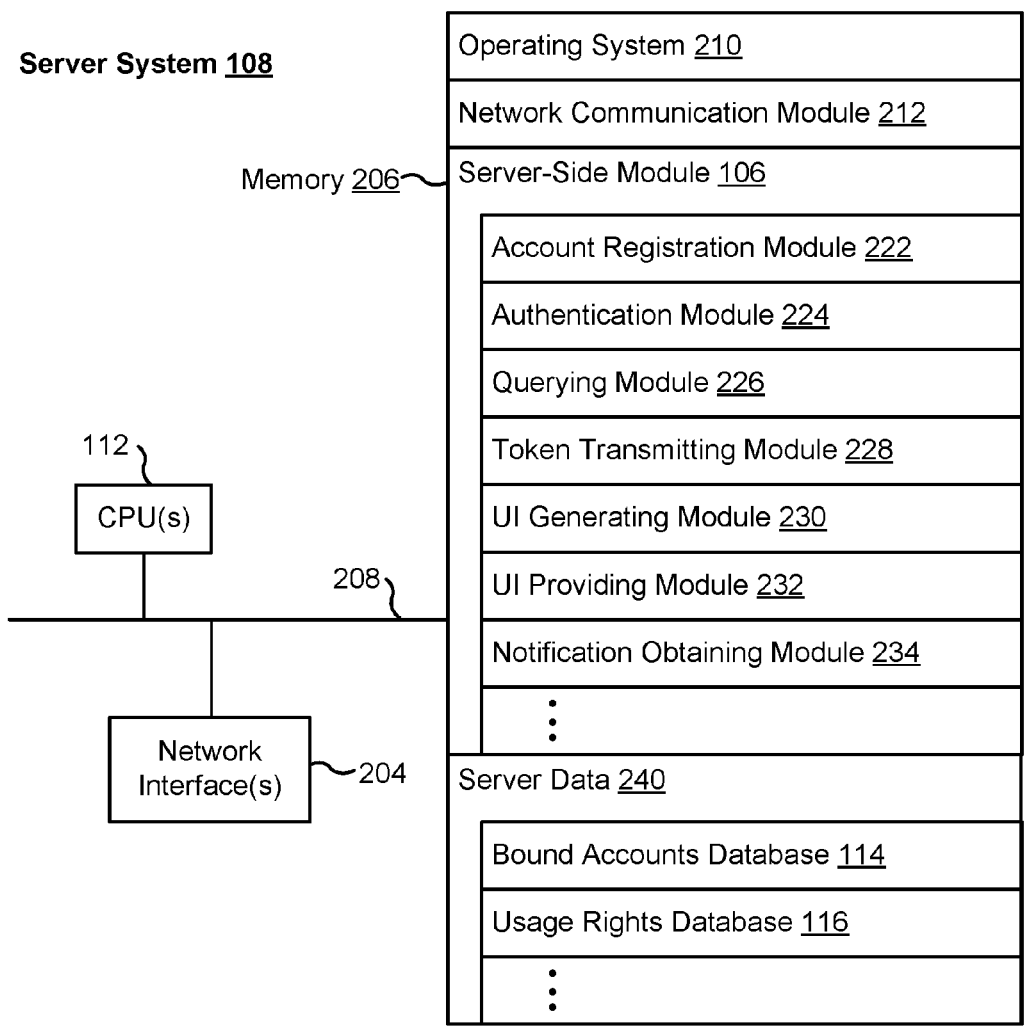
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and sub-server(s) 122) connected to one or more networks 110 via one or more network interfaces 204 (wired or wireless);
- server-side module 106, which provides server-side data processing and functionalities for the unified account access application, including but not limited to:
    - account registration module 222 for registering a new super account for the unified account access application and, optionally, binding one or more sub-accounts to the new super account;
    - authentication module 224 for performing an identity authentication process to validate a respective super account to access the unified account access application;
    - querying module 226 for querying one or more sub-servers 122 corresponding to one or more sub-accounts bound to the respective super account for respective usage rights of the one or more sub-accounts and, optionally, querying one or more sub-servers 122 corresponding to one or more sub-accounts bound to the respective super account for files and/or messages associated with the one or more sub-accounts;
    - token transmitting module 228 for transmitting, to the user of the respective super account, one or more tokens identifying the respective usage rights of each of the one or more sub-accounts bound to the respective super account;
    - UI generating module 230 for generating a user interface ("UI"), including affordances, based at least in part on the usage rights of each of the one or more sub-accounts bound to the respective super account and, optionally, generating a limited user interface that includes development tools for the one or more sub-accounts bound to the respective super account based on the subset of the usage rights for one or more of the sub-accounts indicated in the notification received by notification obtaining module 234;
    - UI providing module 232 for providing the UI generated by UI generating module 230 to the user of the respective super account; and
    - notification obtaining module 234 for receiving a notification from the user of the respective super account to perform an action with the UI provided by UI providing module 232, and for receiving a notification from the user of the respective super account selecting a subset of the usage rights for one or more of the sub-accounts;
- server data 240 storing data for the unified account access application, including but not limited to:
    - bound accounts database 114 storing credentials for sub-account(s) bound to each super account registered with the unified account access application; and
    - usage rights database 116 storing, for each super account registered with the unified account access application, the usage rights of the bound sub-account(s).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
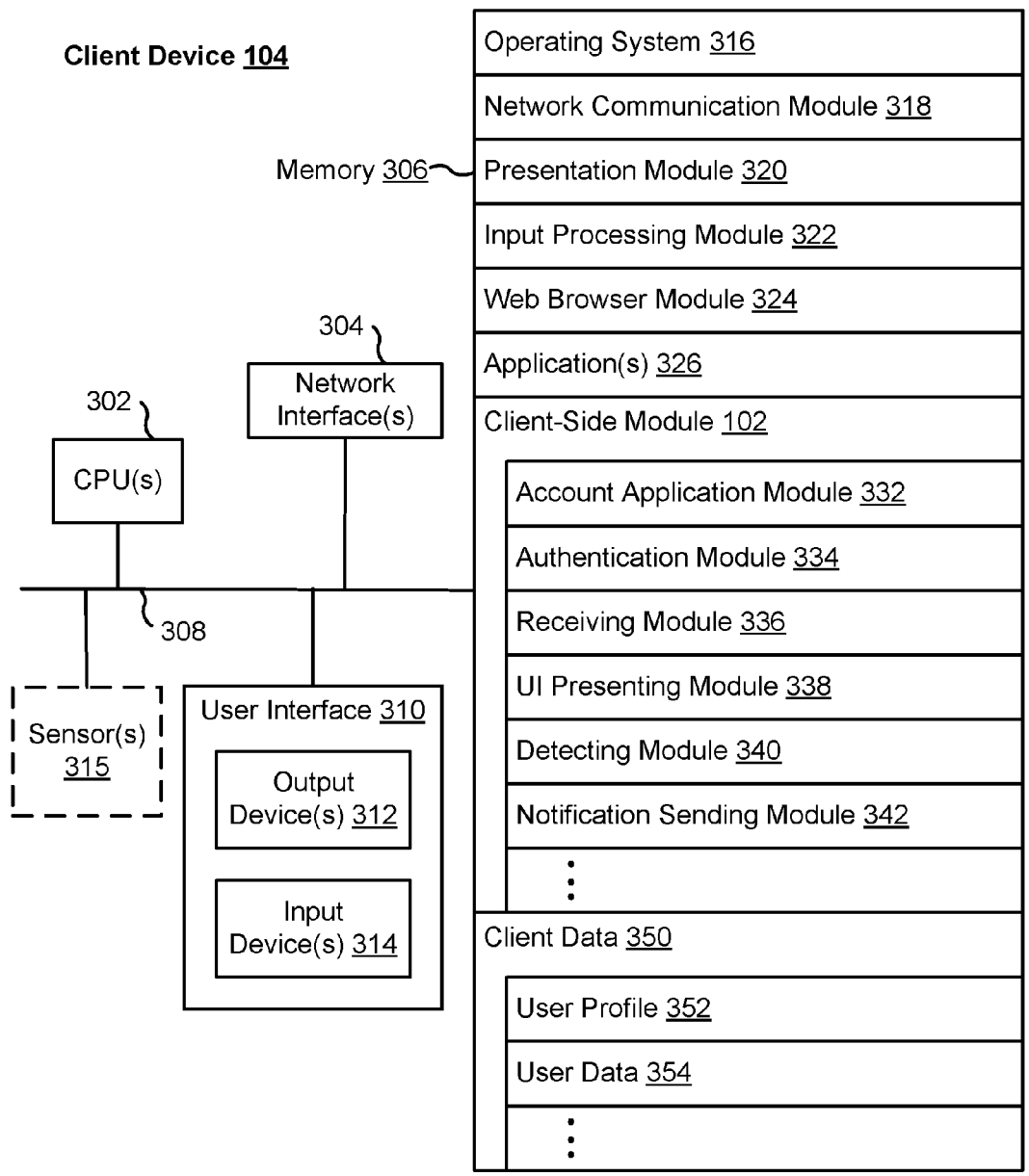
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 optionally includes one or more sensors 315, which provide context information as to the current state of client device 104 or the environmental conditions associated with client device 104. Sensor(s) 315 include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 104 to other computing devices (e.g., server system 108 and sub-server(s) 122) connected to one or more networks 110 via one or more network interfaces 304 (wired or wireless);
- presentation module 320 for enabling presentation of information (e.g., a user interface for application(s) 326 or the unified account access application, widgets, websites and web pages thereof, and/or games, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326 for execution by client device 104 (e.g., games, application marketplaces, payment platforms, and/or other web or non-web based applications);
- client-side module 102, which provides client-side data processing and functionalities for the unified account access application, including but not limited to:
  - account application module 332 for performing an account application process so as to register a new super account with the unified account access application, including binding one or more sub-accounts to the new super account;
  - authentication module 334 for authenticating the user of client device 104 to access his/her respective super account in the unified account access application;
  - receiving module 336 for receiving, from server system 108, one or more tokens identifying the respective usage rights of each of the one or more sub-accounts bound to the respective super account and for receiving, from server system 108, a user interface ("UI") for the unified account access application, including affordances, based at least in part on the usage rights of each of the one or more sub-accounts bound to the respective super account;
  - UI presenting module 338 for presenting the UI, received from server system 108, for the unified account access application on user interface 310;
  - detecting module 340 for detecting a first input from the user of client device 104 to perform an action with the UI presented by UI presenting module 338, and for detecting a second input from the user of client device 104 to select a subset of the usage rights for the one or more sub-accounts bound to the respective super account; and
  - notification sending module 342 for sending a notification to server system 108 indicating the first input from the user of client device 104 to perform an action with the UI, and for sending a notification to server system 108 indicating the second input from the user of client device 104 selecting a subset of the usage rights for the one or more sub-accounts bound to the respective super account; and
- client data 350 storing data associated with the unified account access application, including, but is not limited to:
  - user profile 352 storing a user profile associated with the respective super account of the user of client device 104 for the unified account access application, including a user identifier for the respective super account (e.g., an account name or handle), login credentials to the bound sub-accounts, (optionally) payment data (e.g., linked credit card information, app credit or gift card balance, billing address, shipping address, etc.), an IP address or preferred contact information, environmental condition(s), custom parameters for the user (e.g., age, location, hobbies, etc.), and identified trends and/or likes/dislikes of the user; and
  - user data 354 storing the one or more tokens identifying the respective usage rights of each of the one or more sub-accounts bound to the respective super account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Attention is now directed towards embodiments of user interfaces and associated processes that may be implemented on a client device 104 with one or more speakers 402, one or more microphones 404, and a touch screen 406 (sometimes also herein called a "touch screen display") enabled to receive one or more contacts and display information (e.g., media content, websites and web pages thereof, and/or user interfaces for application(s) 326). FIGS. 4A-4G illustrate exemplary user interfaces for facilitating collaboration across a plurality of platforms in accordance with some embodiments.

Although some of the examples that follow will be given with reference to inputs on touch screen 406 (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to contacts (e.g., finger inputs such as finger contacts, finger tap gestures, finger swipe gestures, etc.), it should be understood that, in some embodiments, one or more of the contacts are replaced with input from another input device (e.g., a mouse-based, stylus-based, or physical button-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact) or depression of a physical button. Similarly, when multiple user inputs are simultaneously detected, it should be understood that multiple computer mice are, optionally, used simultaneously, or a mouse and finger contacts are, optionally, used simultaneously.

FIGS. 4A-4G show interface 408 for the unified account access application displayed on client device 104 (e.g., a mobile phone); however, one skilled in the art will appreciate that the user interfaces shown in FIGS. 4A-4G may be implemented on other similar computing devices. The user interfaces in FIGS. 4A-4G are used to illustrate the processes described herein, including the methods and processes described with respect to FIGS. 5-7 and 8A-8B.

For example, a user of client device 104 downloads the unified account access application from an application marketplace and registers a super account through the unified account access application. Continuing with this example, the user binds one or more sub-accounts to the super account by entering the login credentials for each of the one or more sub-accounts. In some embodiments, a respective sub-account corresponds to one of sub-server(s) 122 which provide services for various platforms (e.g., application hosting, web hosting, or cloud-based services such as video and/or image hosting and storage websites).

Figure 4A:
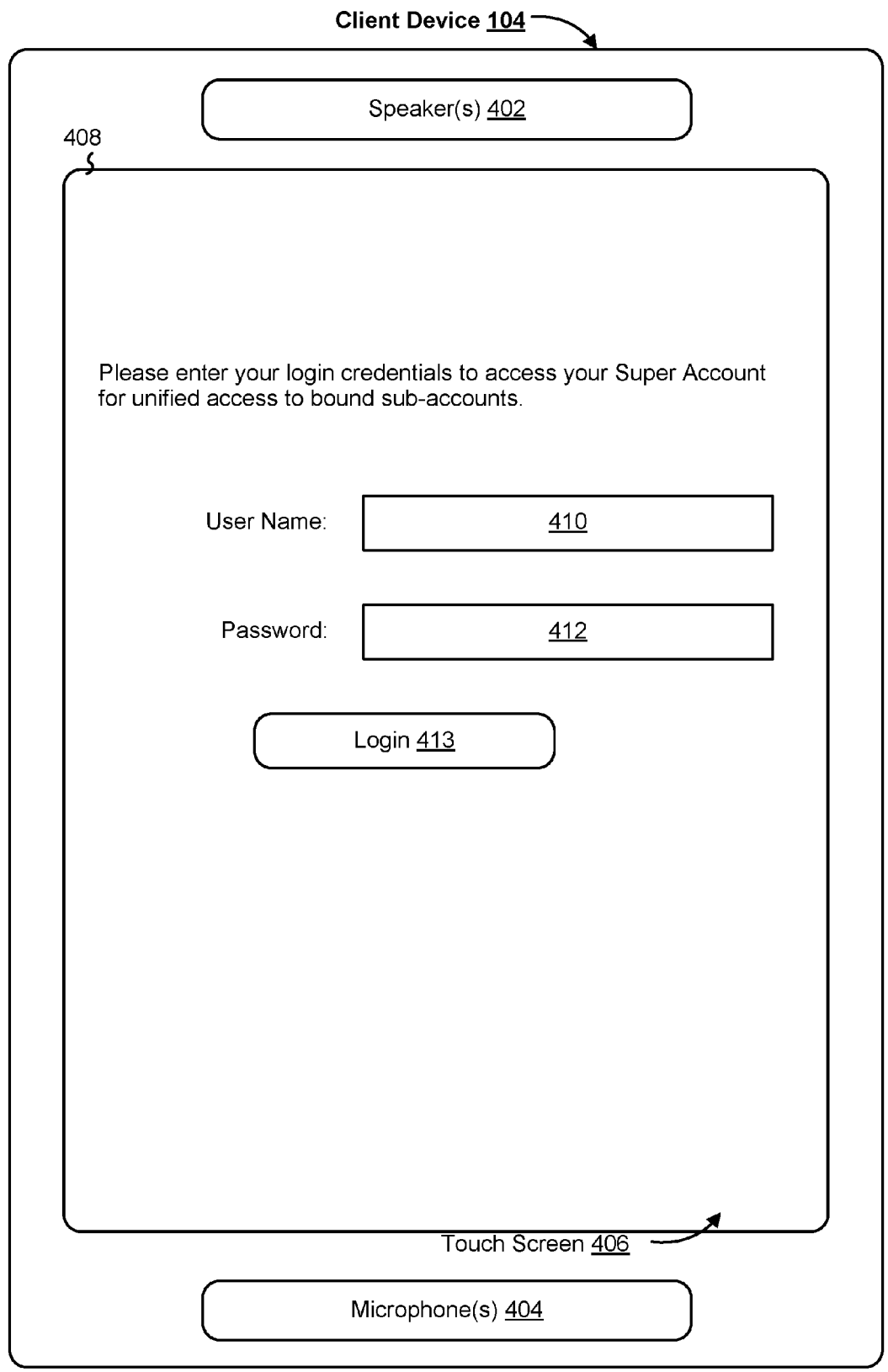
FIGS. 4A-4G illustrate exemplary user interfaces for facilitating collaboration across a plurality of platforms in accordance with some embodiments.

FIG. 4A illustrates client device 104 displaying a login interface for the unified account access application on touch screen 406. In FIG. 4A, the login interface includes a first text input field 410 for entering a user name for a respective super account registered with the unified account access application and second text input field 412 for entering a password for the respective super account registered with the unified account access application. In some embodiments, the user of client device 104 is able to enter characters into first text input field 410 and second text input field 412 with a virtual keyboard displayed on touch screen 406 and/or aurally via one or more microphones 404. In FIG. 4A, the login interface also includes login affordance 413 for submitting the user name entered in text entry field 410 and password entered in text entry field 412 to server system 108 to initiate the identity authentication process.

In some embodiments, after obtaining the user name and password from the client device 104, server system 108 performs an identity authentication process on the respective super account by validating the entered user name and password and optionally performing additional identity verification steps such sending a PIN code via SMS to a phone number linked to the respective super account and requiring a specified action from the user (e.g., enter the PIN code in the login user interface or reply to the SMS from the phone number.) Other secondary verification steps may be used. In some embodiments, biometric verification is performed from the client device, e.g., via a fingerprint sensor or retina scanner, etc. In some embodiments, in accordance with a determination that the identity authentication process is successful, server system 108 queries one or more sub-servers 122 corresponding to the one or more sub-accounts linked to the respective super account for respective usage rights of each of the one or more sub-accounts bound to the respective super account and, optionally, files and/or messages for the one or more sub-accounts bound to the respective super account.

Figure 4B:
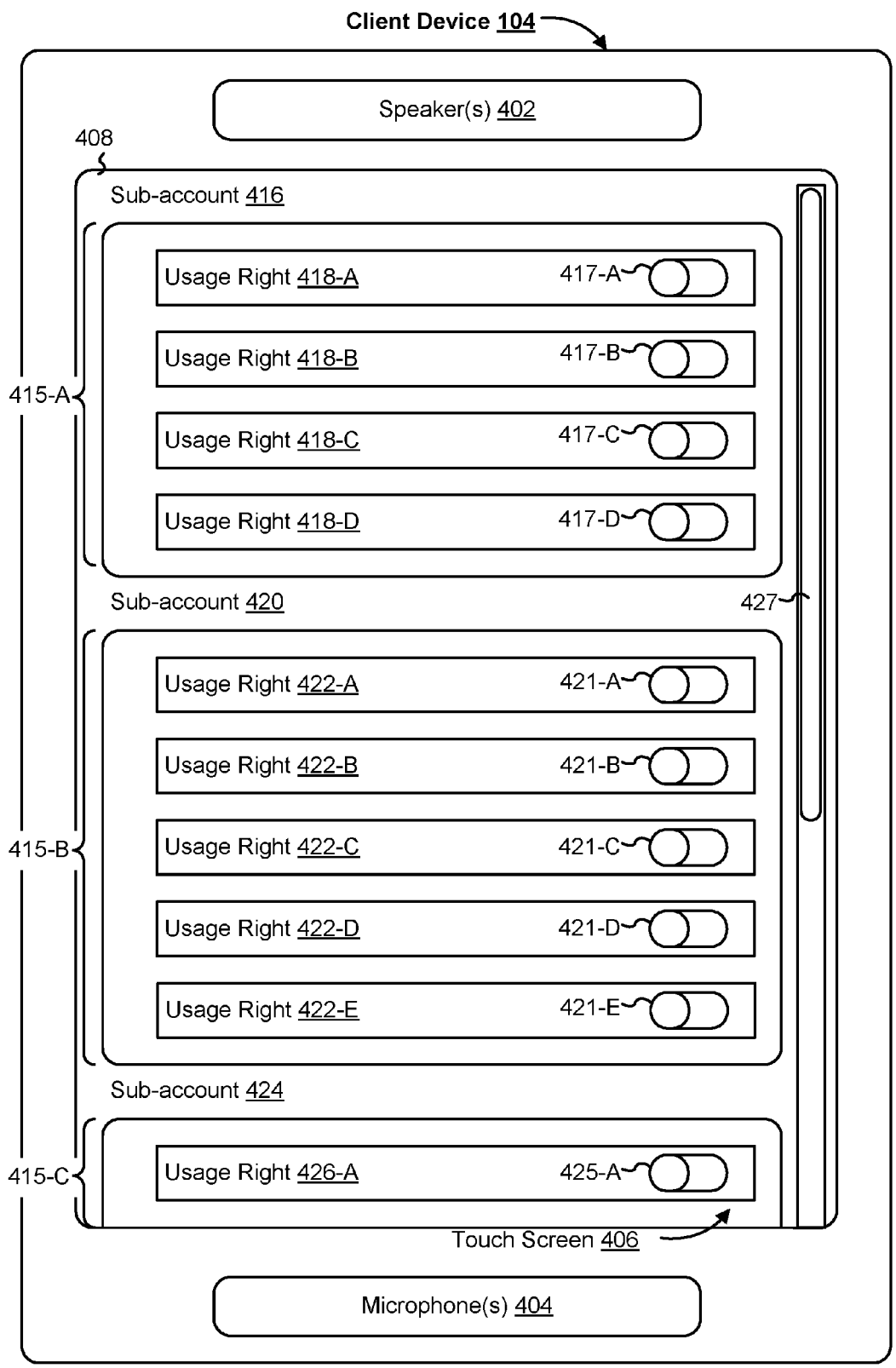

FIG. 4B illustrates client device 104 displaying a usage rights interface on touch screen 406 after server system 108 determines that the identity authentication process performed on the respective user account is successful. In FIG. 4B, the usage rights interface includes a first region 415-A corresponding to first sub-account 416 bound to the respective super account with usage rights 418-A, 418-B, 418-C, and 418-D for first sub-account 416. In FIG. 4B, first region 415-A corresponding to first sub-account 416 bound to the respective super account includes slider affordances 417 for enabling or disabling corresponding usage rights 418 for first sub-account 416. For example, in FIG. 4A, slider affordances 417 indicate that usage rights 418 for first sub-account 416 are all currently enabled. In FIG. 4B, the usage rights interface also includes a second region 415-B corresponding to second sub-account 420 bound to the respective super account with usage rights 422-A, 422-B, 422-C, 422-D, and 422-E for second sub-account 420. In FIG. 4B, second region 415-B corresponding to second sub-account 420 bound to the respective super account includes slider affordances 421 for enabling or disabling corresponding usage rights 422 for second sub-account 420. In FIG. 4B, the usage rights interface further includes a third region 415-C corresponding to third sub-account 424 bound to the respective super account with displayed usage right 426-A for third sub-account 424. In FIG. 4B, third region 415-C corresponding to third sub-account 424 bound to the respective super account includes slider affordance 425-A for enabling or disabling corresponding usage right 426-A for third sub-account 424. In FIG. 4B, the usage rights interface includes scroll bar 427 for displaying the balance of the usage rights interface including additional usage rights 426 for third sub-account 424.

For example, the user of client device 104 is able to limit the number of affordances shown in the home user interface for the unified account access application (e.g., the user interface in FIG. 4C) by disabling some of usage rights 418, 422, and 426 for first sub-account 416, second sub-account 420, and third sub-account 424 via slider affordances 417, 421, and 425, respectively. For example, first sub-account 416, second sub-account 420, and third sub-account 424 correspond to different applications provided by distinct sub-servers 122. In another example, first sub-account 416, second sub-account 420, and third sub-account 424 correspond to a same application provided by a same sub-server 122 but to the same application executed on distinct platforms (e.g., different devices with various processors, video cards, aspect ratios, and/or resolutions) or operating systems (e.g., Android™ and iOS™).

Figure 4C:
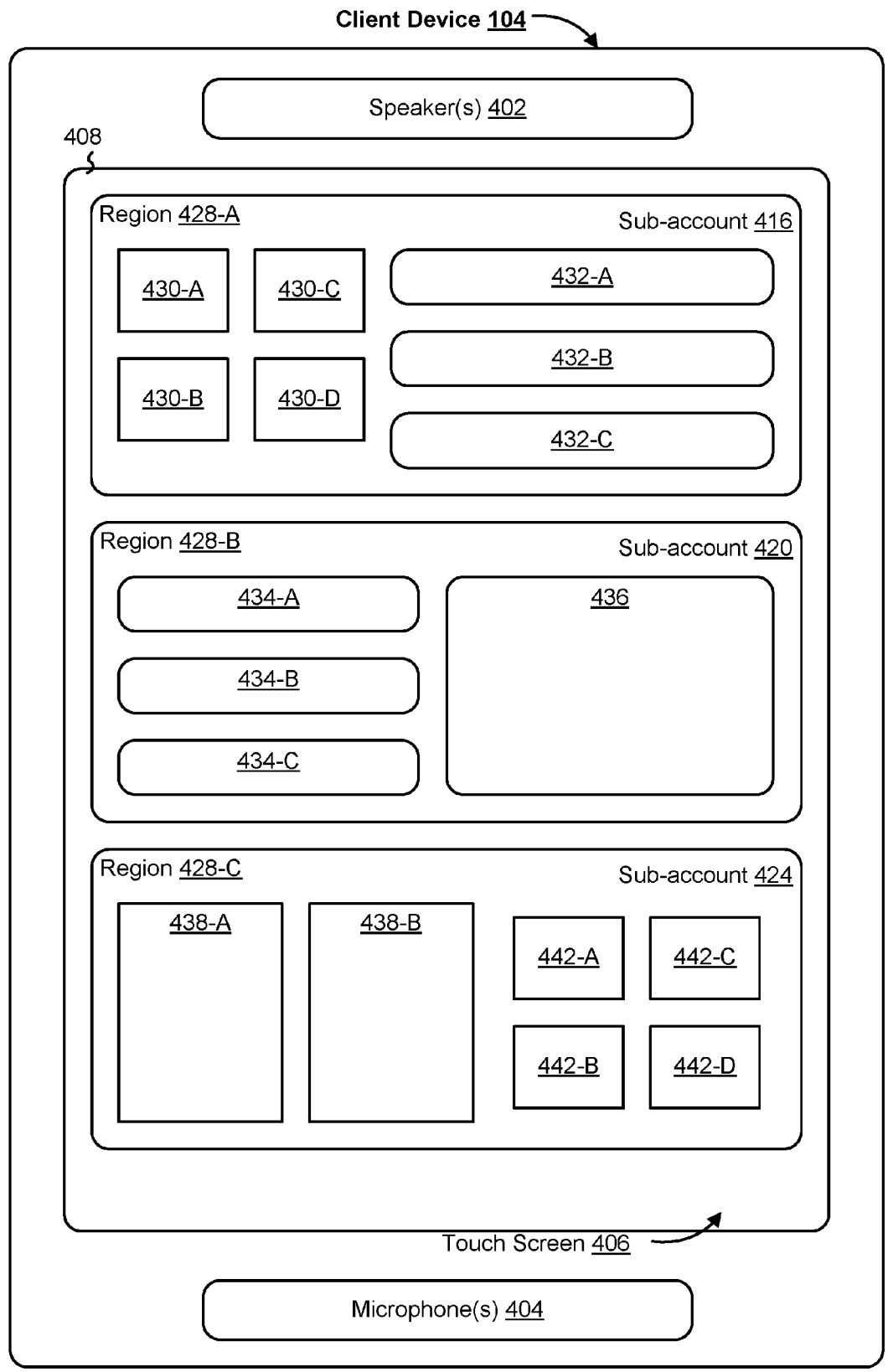

FIG. 4C illustrates client device 104 displaying a home user interface for the unified account access application on touch screen 406 after server system 108 determines that the identity authentication process performed on the respective user account is successful. In some embodiments, the affordances included in the home user interface depend on the respective usage rights of each of the one or more sub-accounts bound to the respective super account and also whether the user of client device 104 has disabled certain usage rights (e.g., using slider affordances 417, 421, and 425 in FIG. 4B).

In FIG. 4C, the home user interface includes a first region 428-A corresponding to first sub-account 416 with affordances 430-A, 430-B, 430-C, and 430-D and text entry fields 432-A, 432-B, and 432-C corresponding to the respective usage rights for first sub-account 416. For example, affordances 430 correspond to performing actions within first sub-account 416 and text entry fields 432 correspond to posting within first sub-account 416. In FIG. 4C, the home user interface also includes a second region 428-B corresponding to second sub-account 420 with text entry fields 434-A, 434-B, and 434-C and text box 436 corresponding to the respective usage rights for second sub-account 420. For example, text entry fields 434 correspond to posting within second sub-account 420 and text box 436 corresponds to viewing messages or viewing of files within second sub-account 420. In FIG. 4C, the home user interface further includes a third region 428-C corresponding to third sub-account 424 with text boxes 438-A and 438-B and affordances 442-A, 442-B, 442-C, and 442-D corresponding to the respective usage rights for third sub-account 424. For example, text boxes 438 corresponds to viewing messages or viewing of files within third sub-account 424 and affordances 442 correspond to performing actions within third sub-account 424.

Figure 4D:
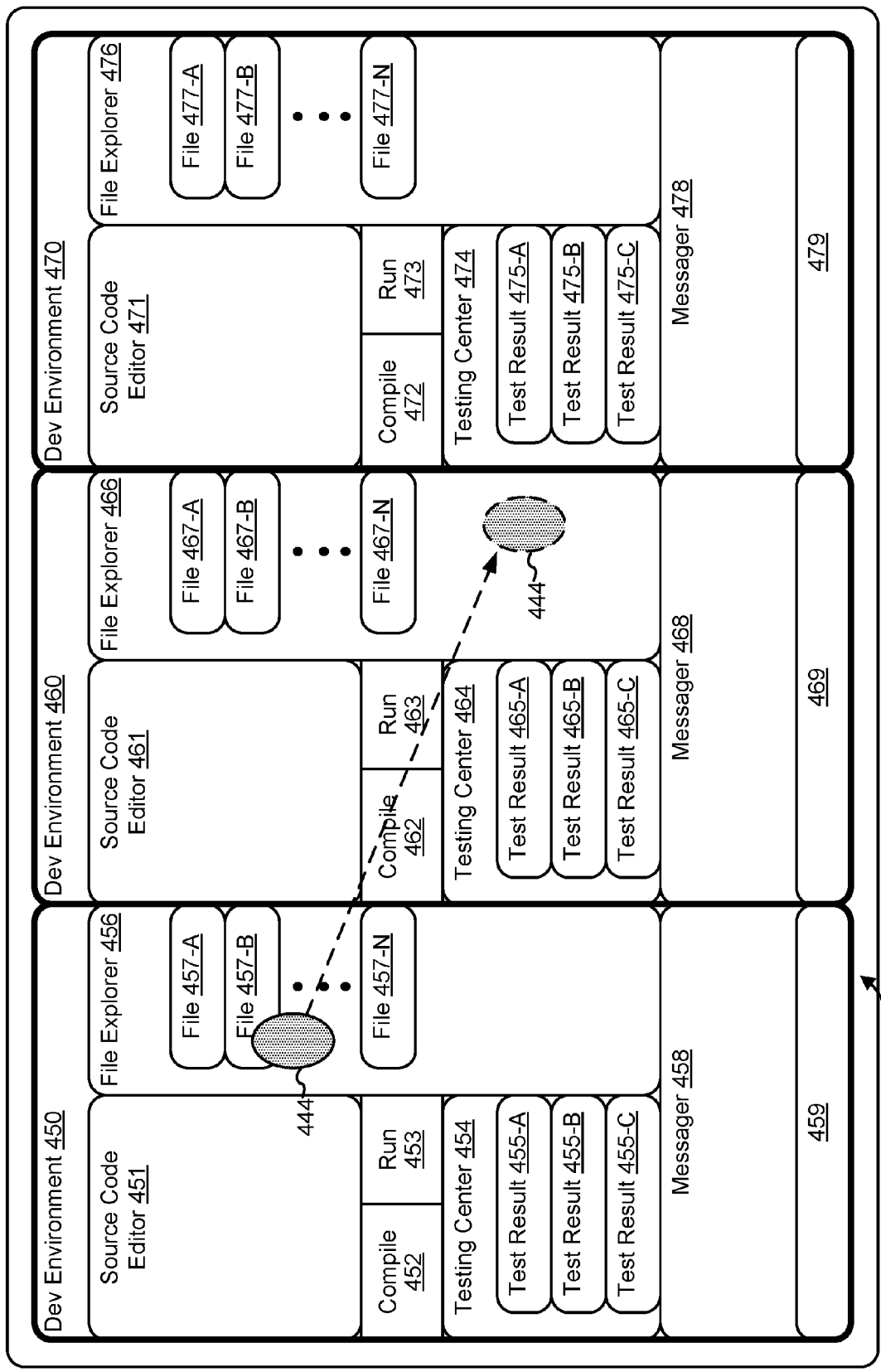

FIG. 4D illustrates client device 104 displaying a multi-developer environment interface for the unified account access application on touch screen 406 after server system 108 determines that the identity authentication process performed on the respective user account is successful. In FIG. 4D, the multi-developer environment interface includes a first developer environment 450 corresponding to a first sub-account bound to the respective super account, a second developer environment 460 corresponding to a second sub-account bound to the respective super account, and a third developer environment 470 corresponding to a third sub-account bound to the respective super account. In some embodiments, first developer environment 450, second developer environment 460, and third developer environment 470 are provided by corresponding sub-servers 122, but are displayed concurrently within the multi-developer environment interface by the unified account access application. In some embodiments, first developer environment 450, second developer environment 460, and third developer environment 470 are displayed within separate windows; however, the unified account access application acts as a communication portal between the sub-servers 122 providing the developer environments so as to enable dragging and dropping of files, test results, tests, code, messages, and the like between first developer environment 450, second developer environment 460, and third developer environment 470. In FIG. 4D, first developer environment 450, second developer environment 460, and third developer environment 470 include similar layout, functions, and affordances; however, one of skill in the art will appreciate how the developer environments may include a subset of the functions and affordances in FIG. 4D, additional functions and affordances not shown in FIG. 4D, and/or a different layout that the developer environments shown in FIG. 4D.

In FIG. 4D, first developer environment 450 includes: a source code editor 451 for editing code for a test; compile affordance 452 for compiling the code in source code editor 451; run affordance 453 for executing the code for the test in source code editor 451; testing center 454 including test results 455-A, 455-B, 455-C corresponding to tests previously run within first developer environment 450; file explorer 456 with files 457-A, 457-B, . . . , 457-N; and messenger 458 for sending messages to other users of the application/platform corresponding to the first sub-account via message entry field 459 and viewing previously sent and received messages (not shown in messenger 458). In FIG. 4D, second developer environment 460 includes: a source code editor 461 for editing code for a test; compile affordance 462 for compiling the code in source code editor 461; run affordance 463 for executing the code for the test in source code editor 461; testing center 464 including test results 465-A, 465-B, 465-C corresponding to tests previously run within second developer environment 460; file explorer 466 with files 467-A, 467-B, . . . , 467-N; and messenger 468 for sending messages to other users of the application/platform corresponding to the first sub-account via message entry field 469 and viewing previously sent and received messages (not shown in messenger 468). In FIG. 4D, third developer environment 470 includes: a source code editor 471 for editing code for a test; compile affordance 472 for compiling the code in source code editor 471; run affordance 473 for executing the code for the test in source code editor 471; testing center 474 including test results 475-A, 475-B, 475-C corresponding to tests previously run within third developer environment 470; file explorer 476 with files 477-A, 477-B, . . . , 477-N; and messenger 478 for sending messages to other users of the application/platform corresponding to the first sub-account via message entry field 479 and viewing previously sent and received messages (not shown in messenger 478). FIG. 4D also illustrates client device 104 detecting a dragging gesture with contact 444 from a first location corresponding to file 457-B within file explorer 456 of first developer environment 450 to a second location within file explorer 466 of second developer environment 460.

Figure 4E:
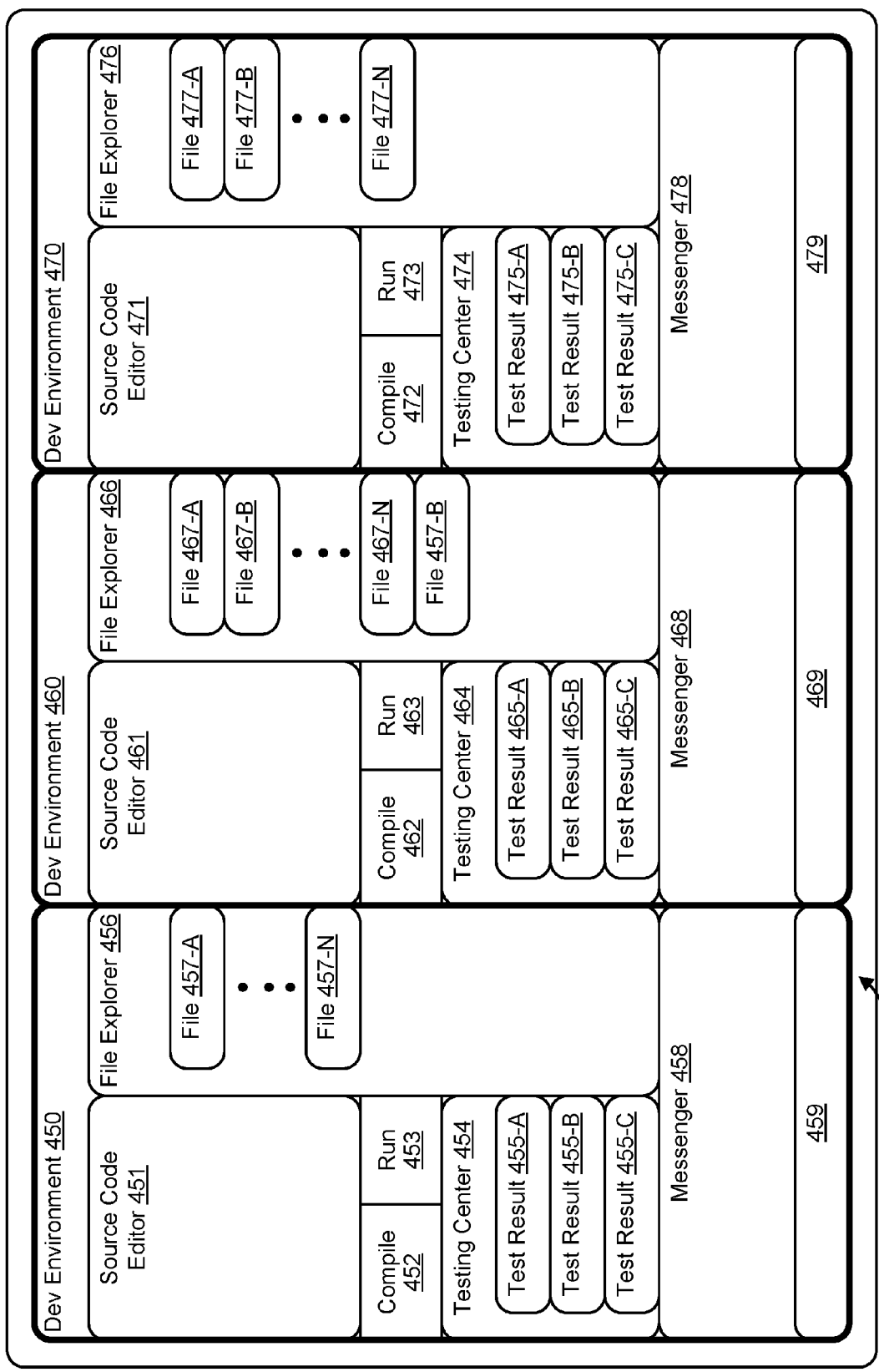

FIG. 4E illustrates client device 104 displaying the multi-developer environment interface for the unified account access application on touch screen 406 after detecting the dragging gesture in FIG. 4D. In FIG. 4E, file 457-B is located within file explorer 466 of second developer environment 460 instead of within file explorer 456 of first developer environment 450 as in FIG. 4D. For example, the dragging gesture with respect to file 457-B (shown in FIG. 4D) caused file 457-B to be moved from first developer environment 450 to second developer environment 460.

Figure 4F:
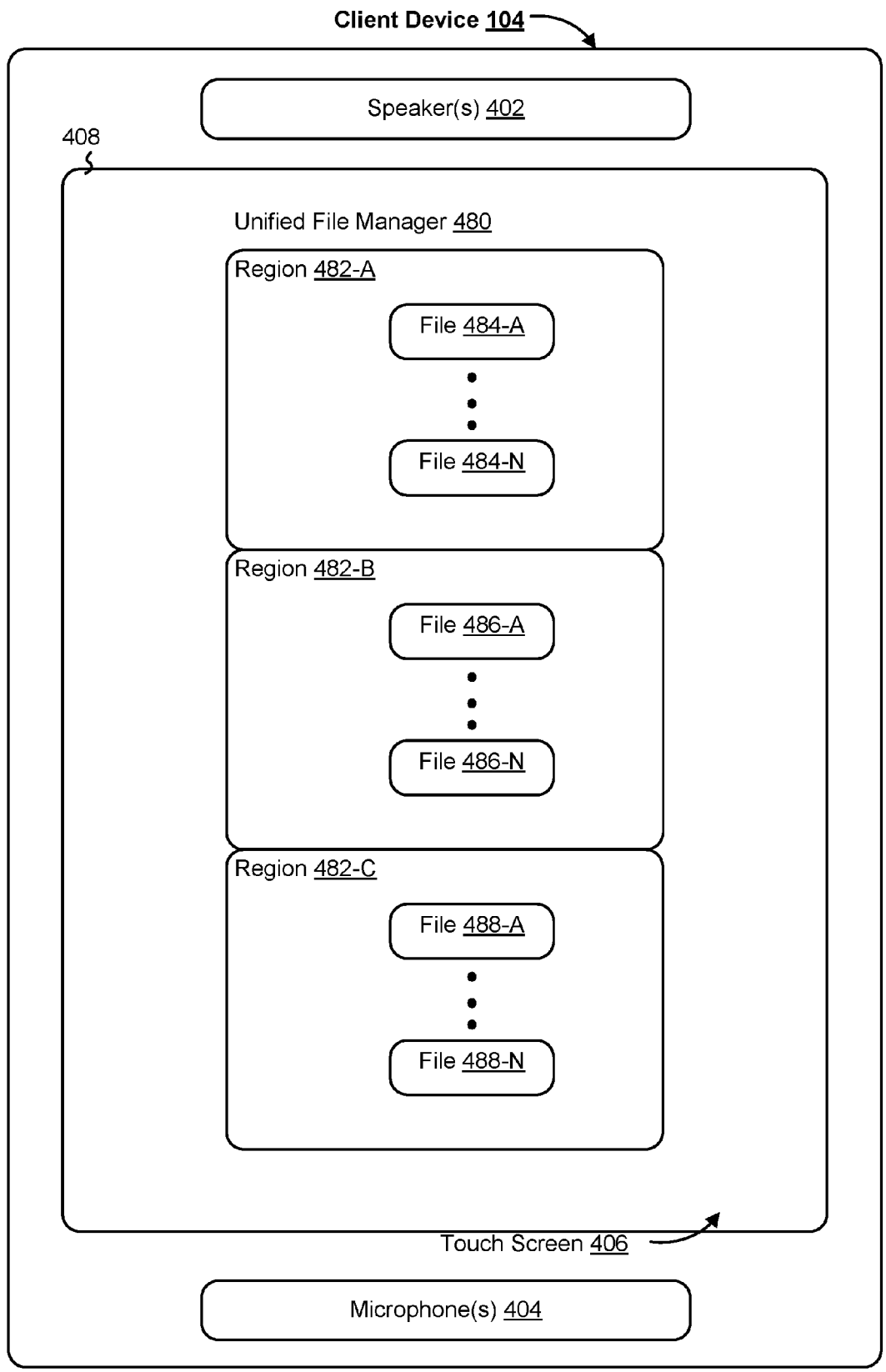

FIG. 4F illustrates client device 104 displaying a unified file manager 480 after server system 108 determines that the identity authentication process performed on the respective user account is successful. For example, unified file manager 480 organizes the files corresponding to each sub-account bound to the respective super account in a file directory/file system view whereby files corresponding to a respective sub-account are displayed as a respective folder of the file directory/file system. In FIG. 4F, unified file manager 480 includes a first region 482-A corresponding to a first sub-account bound to the respective super account with files 484-A, . . . , 484-N within the first sub-account, a second region 482-B corresponding to a second sub-account bound to the respective super account with files 486-A, . . . , 486-N within the second sub-account, and a third region 482-C corresponding to a third sub-account bound to the respective super account with files 488-A, . . . , 488-N within the third sub-account. In some embodiments, unified file manager 480 enables the user of client device 104 to move files between regions 482, remove files, copy and paste files, edit files, view files, delete files, and the like.

Figure 4G:
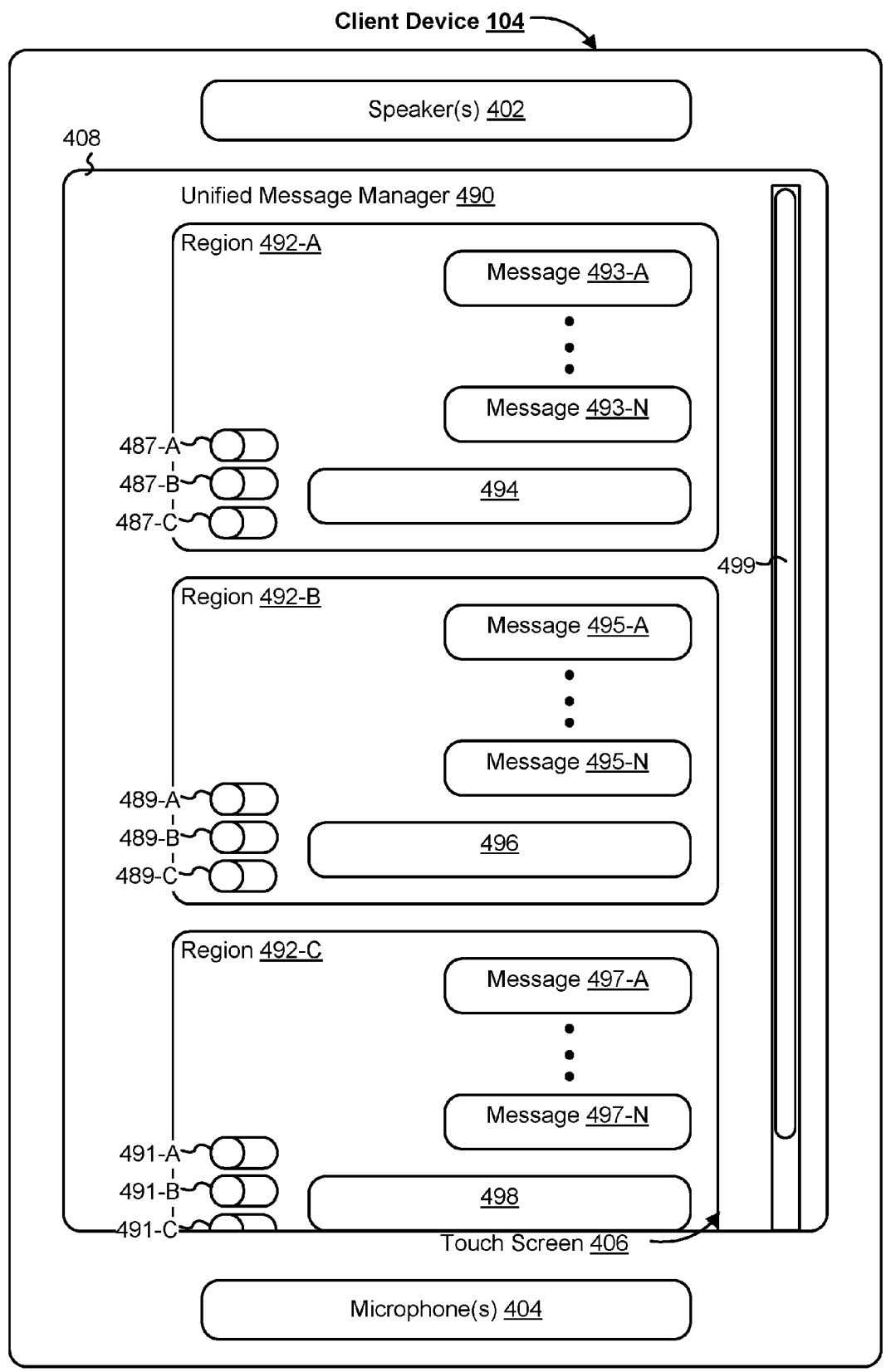

FIG. 4G illustrates client device 104 displaying a unified message manager 490 after server system 108 determines that the identity authentication process performed on the respective user account is successful. For example, unified message manager 490 organizes the messages corresponding to each sub-account bound to the respective super account into a single interface. In FIG. 4G, unified message manager 490 includes a first region 492-A corresponding to a first sub-account bound to the respective super account with messages 493-A, . . . , 493-N sent to or received by the first sub-account and text entry field 494 for entering a message. In some embodiments, the user of client device 104 is able to enter characters into text entry field 494 with a virtual keyboard displayed on touch screen 406 and/or aurally via one or more microphones 404. In FIG. 4G, first region 492-A also includes slider affordances 487-A, 487-B, and 487-C for selecting whether to send a message entered in text entry field 494 within the applications/platforms corresponding to the first sub-account, the second sub-account, and/or the third sub-account, respectively. For example, in FIG. 4G, slider affordances 487 are currently configured in the enabled position such that a message entered in text entry field 494 would be sent within the applications/platforms corresponding to first sub-account, the second sub-account, and the third sub-account; however, the user of client device 104, for example, may disable sending the message within the application/platform corresponding to the third sub-account by configuring slider affordance 487-C in the disabled position (not shown).

In FIG. 4G, unified message manager 490 also includes a second region 492-B corresponding to a second sub-account bound to the respective super account with messages 495-A, . . . , 495-N sent to or received by the second sub-account, text entry field 496 for entering a message, and slider affordances 489-A, 489-B, and 489-C for selecting whether to send a message entered in text entry field 496 within the applications/platforms corresponding to the first sub-account, the second sub-account, and/or the third sub-account, respectively. In FIG. 4G, unified message manager 490 further includes a third region 492-C corresponding to a third sub-account bound to the respective super account with messages 497-A, . . . , 497-N sent to or received by the second sub-account, text entry field 498 for entering a message, and slider affordances 491-A, 491-B, and 491-C for selecting whether to send a message entered in text entry field 498 within the applications/platforms corresponding to the first sub-account, the second sub-account, and/or the third sub-account, respectively. In FIG. 4G, unified message manager 490 includes scroll bar 499 for displaying the balance of third region 492-C.

Figure 5:
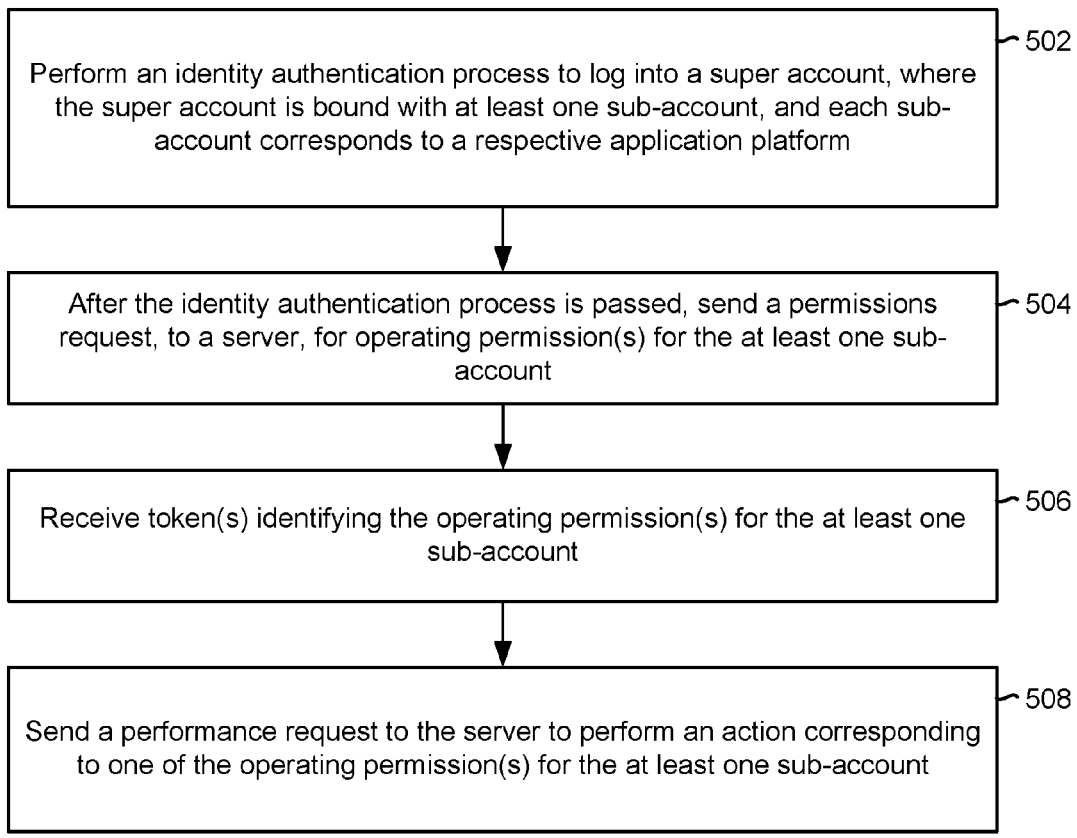
FIG. 5 illustrates a flowchart diagram of a method of multi-account verification in accordance with some embodiments.

FIG. 5 illustrates a flowchart diagram of a method 500 of multi-account verification in accordance with some embodiments. In some embodiments, method 500 is performed by an electronic device with one or more processors and memory. For example, in some embodiments, method 500 is performed by client device 104 (FIGS. 1 and 3) or a component thereof (e.g., client-side module 102, FIGS. 1 and 3). In some embodiments, method 500 is governed by instructions that are stored in a non-transitory computer readable storage medium and the instructions are executed by one or more processors of the electronic device.

In some embodiments, data processing for a unified access application is implemented in client-server environment 100 (FIG. 1) with a server system 108 and client-side module 102 executed on one or more client devices 104. In some embodiments, server system 108 (FIGS. 1-2) manages and operates the unified access application. In some embodiments, a respective client-side module 102 (FIGS. 1 and 3) is associated with a user account in the unified access application that corresponds to a user of client device 104 (FIGS. 1 and 3).

The electronic device performs (502) an identity authentication process to log into a super account, where the super account is bound with at least one sub-account, and each sub-account corresponds to a respective application platform.

After the identity authentication process is passed, the electronic device sends (504) a permissions request, to a server, for operating permission(s) for the at least one sub-account.

The electronic device receives (506) token(s) identifying the operating permission(s) for the at least one sub-account.

The electronic device sends (508) a performance request to the server to perform an action corresponding to one of the operating permission(s) for the at least one sub-account.

In conclusion, according to multi-account verification method 500, the electronic device interacts with the server to utilize the super account to ultimately perform an action associated with one of the sub-accounts bound to the super account. Method 500 allows the electronic device to carry out the identity authentication process once to access bound sub-accounts, so that the operations and time of the developer are saved, and the resources of the server are also saved.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600 and 800, and process 700) are also applicable in an analogous manner to method 500 described above with respect to FIG. 5.

Figure 6:
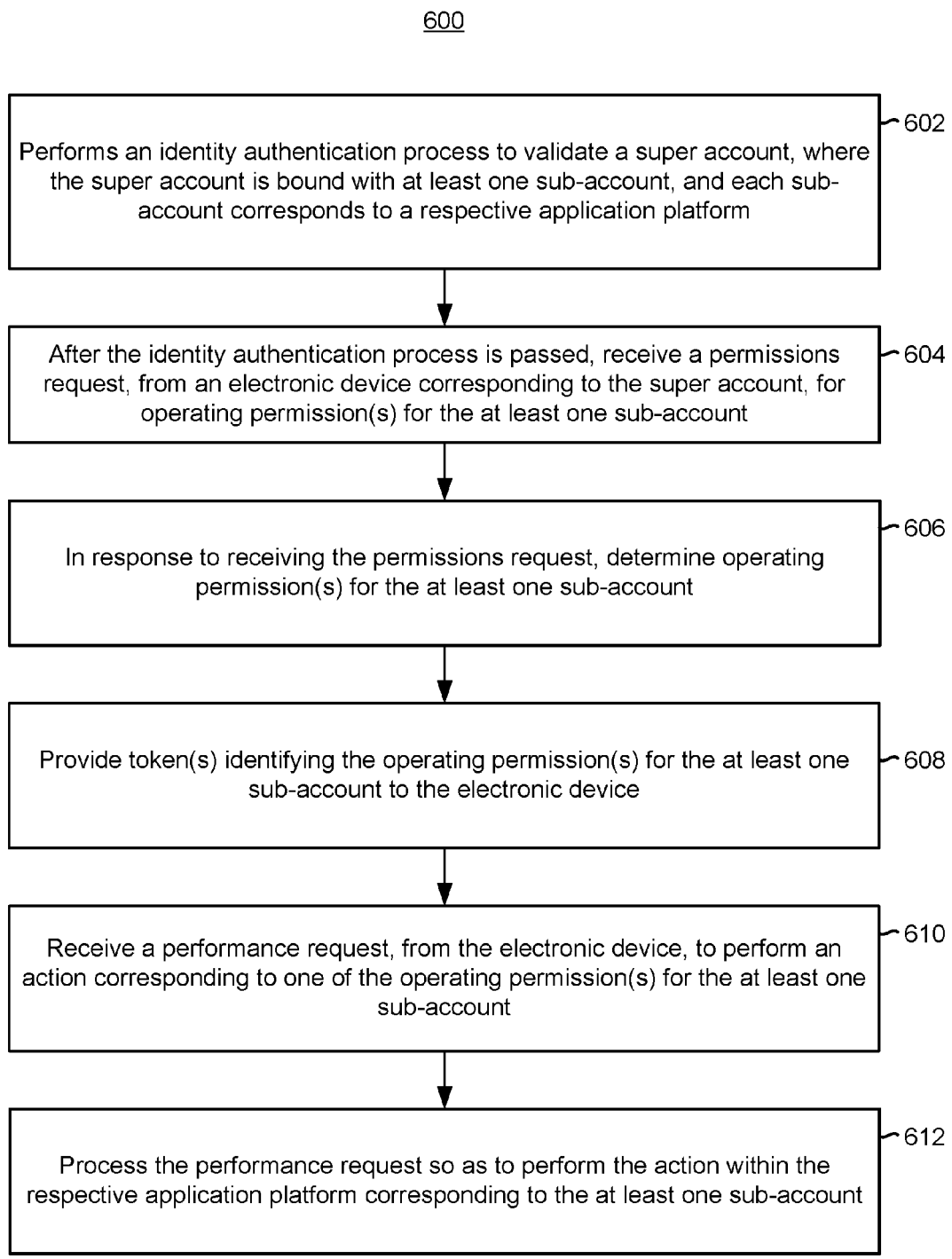
FIG. 6 illustrates a flowchart diagram of a method of multi-account verification in accordance with some embodiments.

FIG. 6 illustrates a flowchart diagram of a method 600 of multi-account verification in accordance with some embodiments. In some embodiments, method 600 is performed by a server system with one or more processors and memory. For example, in some embodiments, method 600 is performed by server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the server system.

In some embodiments, data processing for a unified access application is implemented in client-server environment 100 (FIG. 1) with a server system 108 and client-side module 102 executed on one or more client devices 104. In some embodiments, server system 108 (FIGS. 1-2) manages and operates the unified access application. In some embodiments, a respective client-side module 102 (FIGS. 1 and 3) is associated with a user account in the unified access application that corresponds to a user of client device 104 (FIGS. 1 and 3).

The server performs (602) an identity authentication process to validate a super account, where the super account is bound with at least one sub-account, and each sub-account corresponds to a respective application platform.

After the identity authentication process is passed, the server receives (604) a permissions request, from an electronic device corresponding to the super account, for operating permission(s) for the at least one sub-account.

In response to receiving the permissions request, the server determines (606) operating permission(s) for the at least one sub-account.

The server provides (608) token(s) identifying the operating permission(s) for the at least one sub-account to the electronic device.

The server receives (610) a performance request, from the electronic device, to perform an action corresponding to one of the operating permission(s) for the at least one sub-account.

The server processes (612) the performance request so as to perform the action within the respective application platform corresponding to the at least one sub-account.

In conclusion, according to multi-account verification method 600, the server verifies a super account and processes a performance request as to perform an action in an application platform corresponding to one of the sub-accounts bound to the super account. The problem that the developer needs to respectively carry out the same or similar identity authentication process on each application platform is solved. Instead, the developer merely needs to carry out the identity authentication process once to access bound sub-accounts.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 800, and process 700) are also applicable in an analogous manner to method 600 described above with respect to FIG. 6.

Figure 7A:
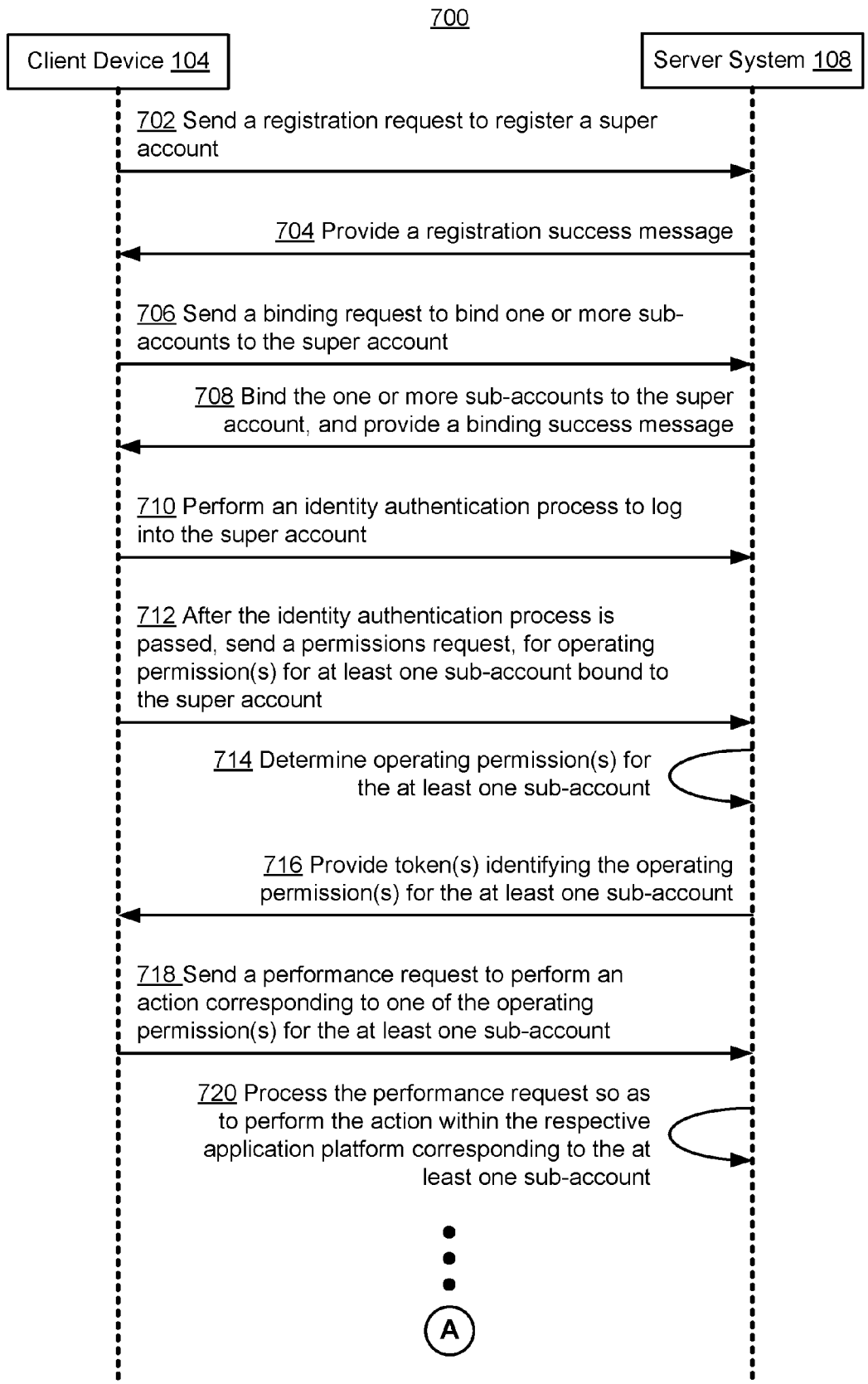
FIGS. 7A-7B illustrate a flow diagram of a process for multi-account verification in accordance with some embodiments.
Figure 7B:
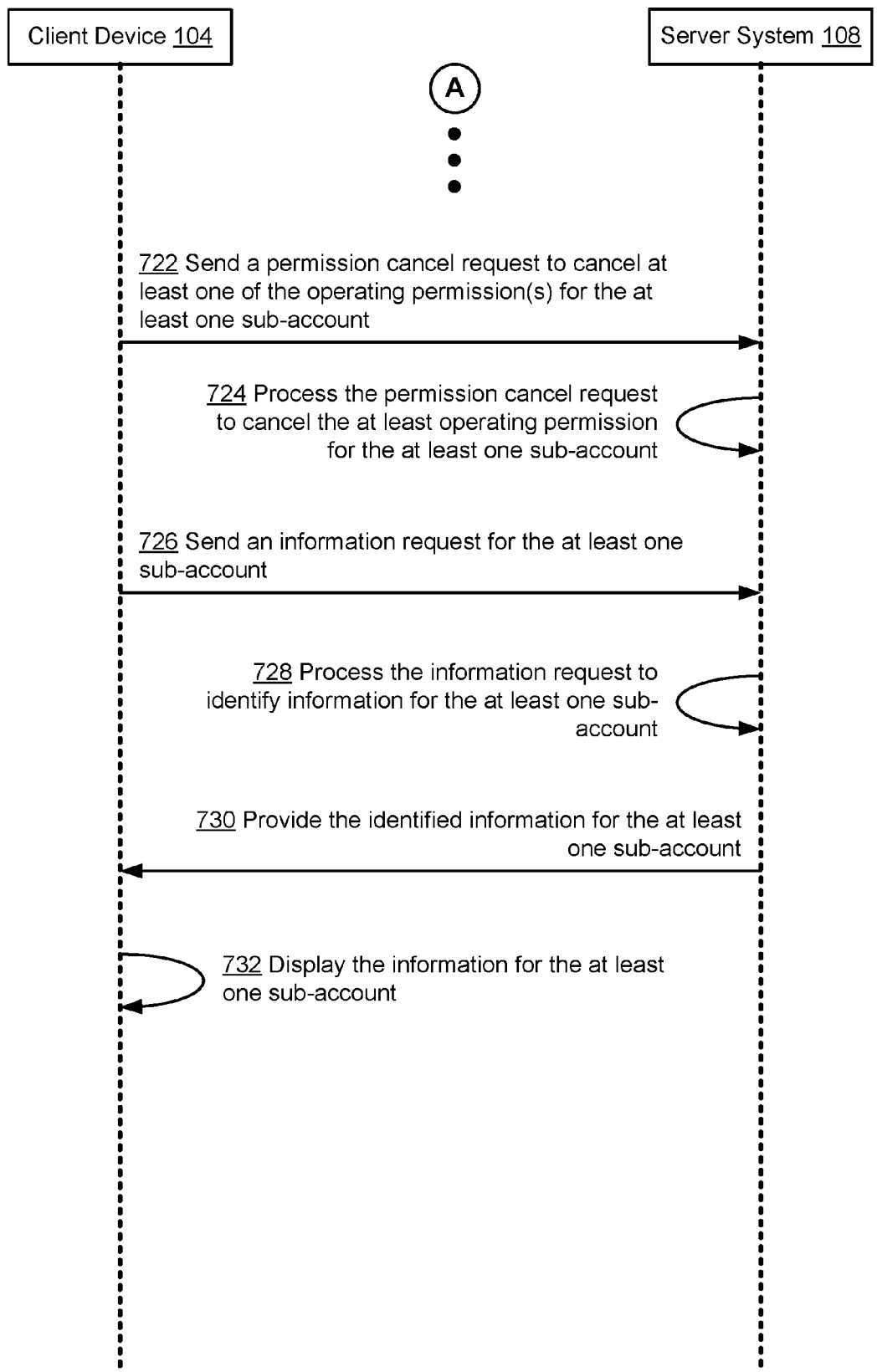

FIGS. 7A-7B illustrate a flow diagram of a process 700 for multi-account verification in accordance with some embodiments. In some embodiments, process 700 is performed at least in part by a server system with one or more processors and memory, and an electronic device (sometimes also herein called a "terminal") with one or more processors and memory. For example, in some embodiments, the server system is server system 108 (FIGS. 1-2) or a component thereof (e.g., server-side module 106, FIGS. 1-2), and the electronic device is client device 104 (FIGS. 1 and 3) or a component thereof (e.g., client-side module 102, FIGS. 1 and 3).

In some embodiments, data processing for a unified access application is implemented in client-server environment 100 (FIG. 1) with a server system 108 and client-side module 102 executed on one or more client devices 104. In some embodiments, server system 108 (FIGS. 1-2) manages and operates the unified access application. In some embodiments, a respective client-side module 102 (FIGS. 1 and 3) is associated with a user account in the unified access application that corresponds to a user of client device 104 (FIGS. 1 and 3).

Client device 104 sends (702) a registration request to register a super account with server system 108. In some embodiments, client device 104 is associated with a developer and the developer usually has at least one sub-account each corresponding to a different application platform. In some embodiments, a respective application platform may comprise a web application platform, a mobile application platform, a hardware application platform, a public account application platform, or the like. The developer may register a super account with server system 108 in order to manage a plurality of sub-accounts. Specifically, client device 104 sends, to server system 108, an account registration request, including a user name and password for the super account to be registered.

Server system 108 provides (704) a registration success message to client device 104 after registering the super account.

Client device 104 sends (706) a binding request to server system 108 to bind one or more sub-accounts to the super account. After the super account is registered or as part of the account registration process, client device 104 may bind one or more sub-accounts to the super account. Specifically, in some embodiments, client device 104 sends a binding request to server system 108, where the binding request is used for binding at least one sub-account to the super account.

Server system 108 binds (708) the one or more sub-accounts to the super account and provides a binding success message to client device 104. In some embodiments, the binding need not happen during registration and may occur at a time subsequent to registration. In some embodiments, server system 108 stores the credentials for each sub-account bound to a super account in bound accounts database 114 (FIGS. 1-2). In some embodiments, prior to binding the one or more sub-accounts to the super account, server system 108 needs to verify whether the user of client device 104 is the real owner of the super account and the one or more sub-accounts. For example, server system 108 may require the user of client device 104 to input an account name and a password of the one or more sub-accounts to be bound to carry out identification authentication, if client device 104 is currently logged into the super account. In another example, server system 108 may require the user of client device 104 to input an account name and a password of the super account to carry out identity authentication, if client device 104 is currently logged into a respective sub-account to be bound. In some embodiments, server system 108 may verify whether the user of client device 104 is the real owner of the super account and the one or more sub-accounts by combining an existed mobile phone verification code verification manner, a token verification manner, or the like. If the binding is succeeded, server system 108 provides a binding success message to client device 104.

Client device 104 performs (710) an identity authentication process to log into the super account, where the super account is bound with at least one sub-account, and each sub-account respectively corresponds to a distinct application platform. Since many functions and resources of the application platform can be used only after a user carries out the identity authentication process, the user of client device 104 interacts with server system 108 by utilizing the super account to complete identity authentication process.

In one possible implementation mode, client device 104 sends an authentication request to server system 108, where the authentication request includes information such as personal identity information, company identity information, historically developed projects, and/or the like. Thereafter, server system 108 completes the identity authentication process according to the information included in the authentication request.

In another possible implementation mode, client device 104 sends an authentication request to server system 108, and server system 108 provides client device 104 with on-line questions (such as questions for testing identity and/or technical capability) after receiving the authentication request. The client device 104 provides to server system 108 answers to the on-line questions with information input by the user of client device 104, and server system 108 completes the identity authentication process according to the contents of the received answers.

In yet another possible implementation mode, after the super account is bound to one or more sub-accounts and if server system 108 detects that a respective sub-account passed the identity authentication process, server system 108 automatically determines that the super account also passes the identity authentication process. Client device 104 receives a message from server system 108 indicating passage of the identity authentication process, thus the super account does not need to carry out the identity authentication process again.

After passing the identity authentication process, client device 104 sends (712) a permissions request, to server system 108, for operating permission(s) for at least one sub-account bound to the super account. In some embodiments, a respective operating permission (sometimes also herein called a "usage right") is a permission for using functions or resources in an application platform, such as an application development permission, an application closed beta test permission, an application open beta test permission, a new product use permission, an application on-line and off-line management permission, or the like. Each operating permission may be the suitable for all application platforms corresponding to the sub-accounts bound to the super account, and also may be merely suitable for some of the application platforms corresponding to the sub-accounts bound to the super account.

Server system 108 determines (714) operating permission(s) for the at least one sub-account. In some embodiments, server system 108 queries sub-servers 122 corresponding to the sub-accounts bound to the super account to determine operating permission(s) for each sub-account bound to the super account.

Server system 108 provides (716), to client device 104, token(s) identifying the operating permission(s) for the at least one sub-account.

In some embodiments, client device 104 sends (718), to server system 108, a performance request to perform an action corresponding to one of the operating permission(s) for the at least one sub-account.

In some embodiments, server system 108 processes (720) the performance request so as to perform the action within the respective application platform corresponding to the at least one sub-account. In some embodiments, server system 108 accesses the at least one sub-account and performed the action within the application platform corresponding to the at least one sub-account according to the performance request.

In some embodiments, client device 104 sends (722), to server system 108, a permission cancel request to cancel at least one of the operating permission(s) for the at least one sub-account. For example, the permission cancel request is used for cancelling one or more operating permissions for one or more sub-accounts.

In some embodiments, server system 108 processes (724) the permission cancel request to cancel the at least operating permission for the at least one sub-account. In some embodiments, server system 108 cancels one or more operating permissions for one or more sub-accounts according to the permission cancel request.

In some embodiments, client device 104 sends (726), to server system 108, an information request to server system 108 for the at least one sub-account. In some embodiments, the information request is used for checking data information of all or part of the at least one sub-account bound to the super account. In some embodiments, the super account is used for managing operating permissions for bound sub-accounts and performing actions associated with those operating permissions. In some embodiments, the super account may further be used for checking the data information of the bound sub-accounts. For example, sub-account A is an account on a mobile application platform, the super account may check the number of on-line mobile applications sub-account A on a mobile application platform, the number of existed registration users of each mobile application, the client grading of each mobile application, and the like. In some embodiments, the information request is used for checking a kind of data information for one sub-account in a corresponding application platform, multiple data information for one sub-account in the corresponding application platform, the same kind of data information for a plurality of sub-accounts in each corresponding application platform, or multiple data information for a plurality of sub-accounts in each corresponding application platform.

In some embodiments, server system 108 processes (728) the information request to identify information for the at least one sub-account. In some embodiments, server system 108 queries sub-servers 122 corresponding to the sub-accounts bound to the super account to for the requested information according to the information request.

In some embodiments, server system 108 provides (730) the identified information for the at least one sub-account to client device 104.

In some embodiments, client device 104 displays (732) the identified information for the at least one sub-account. In some embodiments, client device 104 may display the data information in a character, table, list, and/or data graph manner.

It should be additionally noted: Since the registration time of the super account is later than the registration time of the sub-accounts, a respective sub-account may have passed the identity authentication process when the respective sub-account is bound to the super account. At this time, the method further may include:

(1) Server system 108 detects whether the respective sub-account bound to the super account has an operating permission not authorized to the super account, which can be authorized only after the identity authentication process of the respective sub-account is passed; and (2) If the detection result is that the respective sub-account owns the operating permission, which is not authorized to the super account, server system 108 actively authorizes the operating permission to the super account.

In conclusion, in process 700 for multi-account verification, client device 104 interacts with server system 108 to perform the identity authentication process with the super account. The problem that the developer needs to respectively carry out the same or similar identity authentication process on each application platform is solved. Instead, the developer merely needs to carry out the identity authentication process once to access bound sub-accounts.

According to process 700, server system 108 automatically determines that the identity authentication process of the super account is also passed when server system 108 detects there is a sub-account bound to the super that has passed the identity authentication process. The following effect is achieved: After the super account is registered, and if a sub-account bound to the super that has passed the identity authentication process, the super account does not need to carry out the identity authentication process again. According to the preferred solution, the user may directly use the super account to apply, assign, or cancel operating permissions. According to process 700, server system 108 actively authorizes the operating permissions to the super account when detecting that a bound sub-account owns operating permissions, which are not already authorized to the super account, so as to realize the effect that the super account does not need to apply for the operating permissions again.

In one specific example, company A carries out the development of a web application, a mobile application, a public account application, and a hardware application by utilizing each application platform provided by a service provider B. A development manager of the company A owns a super account, and each sub-account is owned by each development groups respectively corresponding to each application platform. After the development manager of the company A binds the super account with each sub-account, as long as carrying out the identity authentication process once, the development manage may carry out uniform management on the operating permissions of each sub-account, and apply for various new functions and resources for the sub-accounts. In addition, the development manager of the company A may check data, such as the current development progress, the number of existed registered users, the daily flow statistic and the like, of an application developed by each development group through the super account. However, in some embodiments, the development manager of the company A cannot operate functions or resources of the sub-accounts using the super account. That is to say, in some embodiments, the development manager of the company A cannot use various operating permissions by through the super account because the super account merely has the management permissions for various operating permissions, and the use permissions of the various operating permissions are owned by the sub-accounts.

Each development group may use various assigned operating permissions by using the owned sub-account, and carry out tasks, such as application development, application management and the like, on corresponding application platforms by utilizing these operating permissions. When the sub-account needs a certain operating permission, the development groups needs to inform the development manager, and the development manager carries out uniform management by the super account to assign the certain operating permission to the sub-account.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, and 800) are also applicable in an analogous manner to process 700 described above with respect to FIG. 7.

Figure 8A:
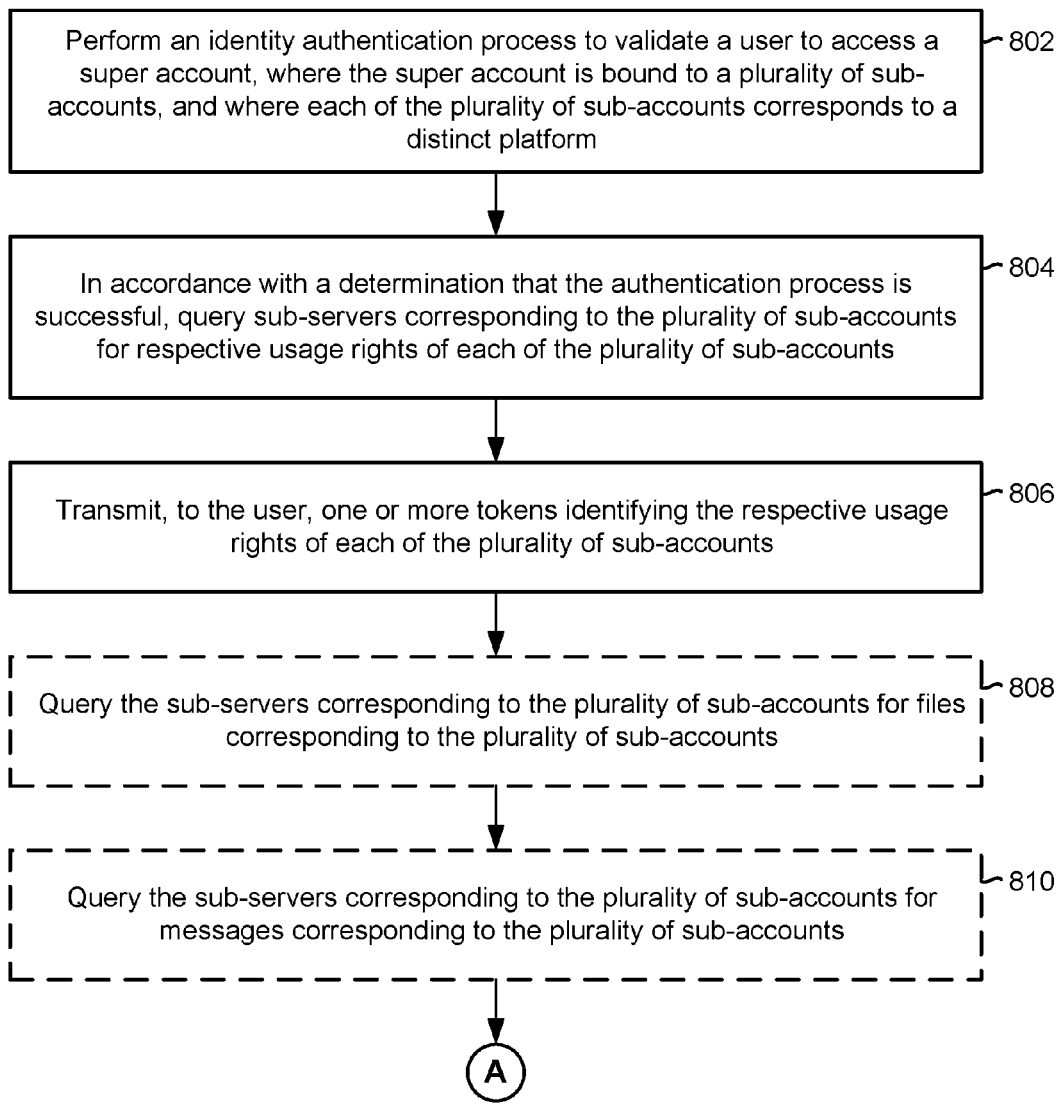
FIGS. 8A-8B illustrate exemplary user interfaces for facilitating collaboration across a plurality of platforms in accordance with some embodiments.
Figure 8B:
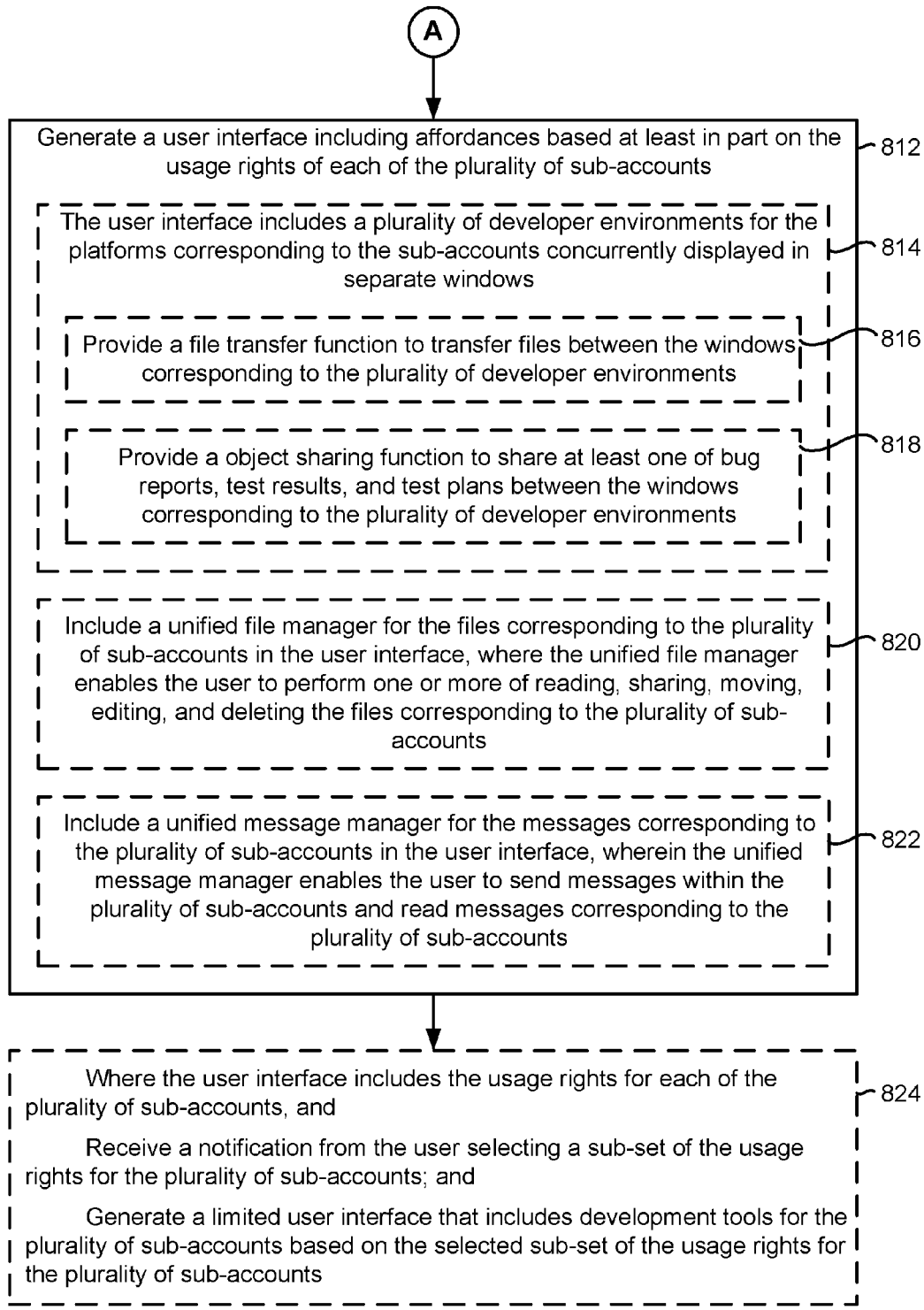

FIGS. 8A-8B illustrate a flowchart diagram of a method 800 of facilitating collaboration across a plurality of platforms in accordance with some embodiments. In some embodiments, method 800 is performed by a server system with one or more processors and memory. For example, in some embodiments, method 800 is performed by server system 108 (FIGS. 1-2) or a component thereof (e.g., server-side module 106, FIGS. 1-2). In some embodiments, method 800 is governed by instructions that are stored in a non-transitory computer readable storage medium and the instructions are executed by one or more processors of the server system. Optional operations are indicated by dashed lines (e.g., boxes with dashed-line borders).

In some embodiments, data processing for a unified access application is implemented in client-server environment 100 (FIG. 1) with a server system 108 and client-side module 102 executed on one or more client devices 104. In some embodiments, server system 108 (FIGS. 1-2) manages and operates the unified access application. In some embodiments, a respective client-side module 102 (FIGS. 1 and 3) is associated with a user account in the unified access application that corresponds to a user of client device 104 (FIGS. 1 and 3).

The server performs (802) an identity authentication process to validate a user to access a super account, where the super account is bound to a plurality of sub-accounts, and where each of the plurality of sub-accounts corresponds to a distinct platform. In some embodiments, server system 108 or a component thereof (e.g., authentication module 224, FIG. 2) performs an identity authentication process to validate a respective super account to access the unified account access application. For example, a first user associated with the super account also owns the sub-accounts bound to the super account. In this example, the first user is able to access at least a portion of all bound sub-accounts from the super account with a single identity authentication process. In another example, a second user associated with the super account is a manager of development groups whereby each bound sub-account is managed and operated by a developer or a developer group that is developing an application for a different platform. In this example, the manager is able to check on the progress of the development groups from the super account with a single identity authentication process. However, in some circumstances, the manager is unable to access the functions and/or resources of the bound sub-accounts.

In some embodiments, the identity identification process requires two-factor authentication or similar secured authentication. In some embodiments, the user previously bound one or more sub-accounts to the respective super account during registration of the super account or a time subsequent to registration. In some embodiments, each bound sub-account corresponds to a same application running on a different platform (i.e., OS, device-type, etc.). Thus, the user is able to perform two-factor authentication one-time and access all bound sub-accounts instead of performing the two-factor authentication to multiple times when separately logging into the sub-accounts. For example, the user of client device 104 initiates the identity authentication process by entering his/her user name for an existing super account in text entry field 410 and his/her password for the existing super account text entry field 412 and selecting login affordance 413.

In accordance with a determination that the identity authentication process is successful, the server queries (804) sub-servers corresponding to the plurality of sub-accounts for respective usage rights of each of the plurality of sub-accounts. In some embodiments, after the identity authentication process is successful, server system 108 or a component thereof (e.g., querying module 226, FIG. 2) queries one or more sub-servers 122 corresponding to one or more sub-accounts bound to the respective super account for respective usage rights of the one or more sub-accounts. As such, the server determines the usage rights for each of the sub-accounts bound to the super account. For example, the usage rights indicate functions that are available to each sub-account such as specific developer tools or publishing rights.

The server transmits (806), to the user, one or more tokens identifying the respective usage rights of each of the plurality of sub-accounts. In some embodiments, after obtaining the respective usage rights for the one or more sub-accounts bound to the super account, server system 108 or a component thereof (e.g., token transmitting module 228, FIG. 2) transmits, to client device 104 of the user corresponding to the respective super account, one or more tokens identifying the respective usage rights of each of the one or more sub-accounts bound to the respective super account. In some embodiments, the token (sometimes also herein called "rights certificates") enables the user to perform any of the operations he/she is authorized to perform when logged into the plurality of sub-accounts. Thus, for example, if sub-account A for platform A is allowed to release new products but account B for platform B is not allowed to release new products, the token will indicate such asymmetrical usage rights and only allow the user to release new products within platform B. In some embodiments, the token is cached by client device 104 of the user. In some embodiments, the cached token is updated each time the user logins into the super account so as to provide up-to-date usage rights for the plurality of sub-accounts and to add or delete usage rights for newly bound or unbound sub-accounts. If multiple tokens are sent to client device 104, the appropriate token is selected and sent to server system 108 when the user choose to operate on a particular sub-account, and server system 108 can forward the appropriate token to a respective sub-server 122 corresponding to the particular sub-account to enable the user's access to the particular sub-account.

In some embodiments, prior to generating the user interface, the server queries (808) the sub-servers corresponding to the plurality of sub-accounts for files corresponding to the plurality of sub-accounts. In some embodiments, after the identity authentication process is successful, server system 108 or a component thereof (e.g., querying module 226, FIG. 2) queries one or more sub-servers 122 corresponding to one or more sub-accounts bound to the respective super account for files associated with the one or more sub-accounts. For example, the files for a respective sub-account include test plans, test results, performance data, viewing statistics and/or other analytics data, numbers of followers of the respective sub-account, and the like.

In some embodiments, prior to generating the user interface, the server queries (810) the sub-servers corresponding to the plurality of sub-accounts for messages corresponding to the plurality of sub-accounts. In some embodiments, after the identity authentication process is successful, server system 108 or a component thereof (e.g., querying module 226, FIG. 2) queries one or more sub-servers 122 corresponding to one or more sub-accounts bound to the respective super account for messages associated with the one or more sub-accounts. In some embodiments, server system 108 queries a respective sub-server 122 for all messages (e.g., emails, instant messages between team members, messages posted to team bulletin boards, etc.) sent to and sent by a respective sub-account registered to the respective sub-server 122.

The server generates (812) a user interface including affordances based at least in part on the usage rights of each of the plurality of sub-accounts. In some embodiments, server system 108 or a component thereof (e.g., UI generating module 230, FIG. 2) generates a user interface, including affordances, based at least in part on the usage rights of each of the one or more sub-accounts bound to the respective super account. Subsequently, in some embodiments, server system 108 or a component thereof (e.g., UI providing module 232, FIG. 2) provides the user interface generated by UI generating module 230 to a client device 104 of the user of the respective super account.

In some embodiments, server system 108 generates a web interface that is displayed by client device 104 of the user with buttons and affordances that correspond to the user's usage rights within each of the plurality of sub-accounts. For example, if sub-account A for platform A is allowed to release new products but account B for platform B is not allowed to release new products, the interface will include an affordance for releasing new products within platform A but not platform B. FIG. 4C, for example, shows client device 104 displaying a home user interface for the unified account access application on touch screen 406 after server system 108 determines that the identity authentication process performed on the respective user account is successful. For example, the affordances included in the home user interface in FIG. 4C depend on the respective usage rights of first sub-account 416, second sub-account 420, and third sub-account 424 bound to the respective super account.

In some embodiments, the user interface includes (814) a plurality of developer environments for the platforms corresponding to the sub-accounts concurrently displayed in separate windows. In some embodiments, the plurality of developer environments are provided by sub-servers 122 corresponding to the sub-accounts. For example, a developer environment for a respective platform looks like the developer environment if a respective sub-account for the respective platform was logged into the respective platform. FIG. 4D, for example, shows client device 104 displaying a multi-developer environment interface for the unified account access application on touch screen 406 after server system 108 determines that the identity authentication process performed on the respective user account is successful. In FIG. 4D, the multi-developer environment interface includes a first developer environment 450 corresponding to a first sub-account bound to the respective super account, a second developer environment 460 corresponding to a second sub-account bound to the respective super account, and a third developer environment 470 corresponding to a third sub-account bound to the respective super account. For example, first developer environment 450, second developer environment 460, and third developer environment 470 are provided by corresponding sub-servers 122, but are displayed concurrently within the multi-developer environment interface by the unified account access application.

In some embodiments, the server provides (816) a file transfer function to transfer files between the windows corresponding to the plurality of developer environments. For example, the user is able to drag and drop files, test results, and test plans between the developer environments in each window. When providing the file transfer function, server system 108 may rely on client device 104 to detect user actions on the user interface indicative of the user's desire to move one or more files from one window to another window, client device 104 transmits the user's command for file transfer to server system 108, and server system 108 interacts with sub-servers 122 corresponding to the sub-accounts that corresponding to the developer environments affected by the user's command, e.g., copy the files from a first sub-server 122 corresponding to a first sub-account on behalf of the user and send the files to a second sub-server 122 corresponding to a second sub-account to save it under that second sub-account. The multi-step interactions between server system 108 of the super account and sub-servers 122 of the affected sub-accounts are transparent to the user, and the result of the file transfer is shown to the user in the user interface, after the user performed the drag and drop (or copy and paste) action across the windows corresponding to the multiple developer environments.

In FIG. 4D, for example, first developer environment 450, second developer environment 460, and third developer environment 470 are displayed within separate windows; however, the unified account access application acts as a communication portal between the sub-servers 122 providing the developer environments so as to enable dragging and dropping of files, test results, tests, code, messages, and the like between first developer environment 450, second developer environment 460, and third developer environment 470. FIG. 4D, for example, shows client device 104 detecting a dragging gesture with contact 444 from a first location corresponding to file 457-B within file explorer 456 of first developer environment 450 to a second location within file explorer 466 of second developer environment 460. FIG. 4E, for example, shows client device 104 displaying the multi-developer environment interface for the unified account access application on touch screen 406 after detecting the dragging gesture in FIG. 4D. In FIG. 4E, for example, file 457-B is located within file explorer 466 of second developer environment 460 instead of within file explorer 456 of first developer environment 450 as in FIG. 4D. For example, the dragging gesture with respect to file 457-B in FIG. 4D caused file 457-B to be moved from first developer environment 450 to second developer environment 460 as shown in FIG. 4E.

In some embodiments, the server provides (818) an object sharing function to share at least one of bug reports, test results, and test plans between the windows corresponding to the plurality of developer environments. For example, this enables the user to attempt to recreate a bug observed in platform A with sub-account A on platform B with sub-account B by performing the same test plan (or a slightly modified version thereof) that produced the bug observed in platform A. This can also be accomplished by drag and drop action across windows, or through a more sophisticated user interface in which the user can specify more details of the sharing between the multiple developer platforms, e.g., which team members to communicate about the sharing, which product is the sharing related to, etc. Similar to providing the file transfer function, server system 108 of the super account essentially acts on behalf of the user, and performs the multi-step interaction with sub-servers 122 of the sub-accounts to accomplish the sharing of the bug reports, test results, test plans, etc. from one developer environment to one or more other developer environments, without the user having to manually perform each step. For example, in FIGS. 4D-4E, the user of client device 104 may drag and drop code from source code editor 451 in developer environment 450 for a first sub-account (e.g., platform A) into source code editor 461 in developer environment 460 for a second sub-account (e.g., platform B). In another example, the user of client device 104 may drag and drop a respective file 457 corresponding to a test plan from file explorer 456 in developer environment 450 for a first sub-account (e.g., platform A) into file explorer 466 in developer environment 460 for a second sub-account (e.g., platform B).

In some embodiments, after querying (808) the sub-servers corresponding to the plurality of sub-accounts for files corresponding to the plurality of sub-accounts, the server includes (820) a unified file manager for the files corresponding to the plurality of sub-accounts in the user interface, where the unified file manager enables the user to perform one or more of reading, sharing, moving, editing, and deleting the files corresponding to the plurality of sub-accounts. In some embodiments, the interface includes a file explorer view of the files for the plurality of sub-accounts (e.g., test plans, test results, etc.). In some embodiments, the files include libraries available to sub-accounts. The unified file manager can list the different sub-accounts as "folders," and the files associated with each sub-account are included in a file hierarchy under the "folder" of the sub-account. The user can manipulate the files in multiple sub-accounts as if they are files saved in a single file system under the super account.

FIG. 4F, for example, shows client device 104 displaying a unified file manager 480 after server system 108 determines that the identity authentication process performed on the respective user account is successful. For example, unified file manager 480 organizes the files corresponding to each sub-account bound to the respective super account in a file directory/file system view whereby files corresponding to a respective sub-account are displayed as a respective folder of the file directory/file system. For example, in FIG. 4F, unified file manager 480 includes a first region 482-A corresponding to a first sub-account bound to the respective super account with files 484-A, . . . , 484-N within the first sub-account, a second region 482-B corresponding to a second sub-account bound to the respective super account with files 486-A, . . . , 486-N within the second sub-account, and a third region 482-C corresponding to a third sub-account bound to the respective super account with files 488-A, . . . , 488-N within the third sub-account. For example, unified file manager 480 enables the user of client device 104 is able to move files between regions 482, remove files, copy and paste files, edit files, view files, delete files, and the like.

In some embodiments, after querying (810) the sub-servers corresponding to the plurality of sub-accounts for messages corresponding to the plurality of sub-accounts, the server includes (822) a unified message manager for the messages corresponding to the plurality of sub-accounts in the user interface, where the unified message manager enables the user to send messages within the plurality of sub-accounts and read messages corresponding to the plurality of sub-accounts. In some embodiments, the interface includes a message center with all messages send and received within the plurality of sub-accounts. The message center enables the user to respond to messages sent to a respective sub-account and to forward messages to sub-account B that were originally sent to sub-account A.

FIG. 4G, for example, shows client device 104 displaying a unified message manager 490 after server system 108 determines that the identity authentication process performed on the respective user account is successful. For example, unified message manager 490 in FIG. 4G organizes the messages corresponding to each sub-account bound to the respective super account into a single interface. In FIG. 4G, unified message manager 490 includes: a first region 492-A corresponding to a first sub-account bound to the respective super account; a second region 492-B corresponding to a second sub-account bound to the respective super account; and a third region 492-C corresponding to a third sub-account bound to the respective super account. In some embodiments, the user of client device 104 is able to enter characters into text entry field 494 with a virtual keyboard displayed on touch screen 406 and/or aurally via one or more microphones 404. In FIG. 4G, first region 492-A also includes slider affordances 487-A, 487-B, and 487-C for selecting whether to send a message entered in text entry field 494 within the applications/platforms corresponding to the first sub-account, the second sub-account, and/or the third sub-account, respectively.

In some embodiments, the user interface includes the usage rights for each of the plurality of sub-accounts, and the server (824): receives a notification from the user selecting a subset of the usage rights for the plurality of sub-accounts; and generates a limited user interface that includes development tools for the plurality of sub-accounts based on the selected subset of the usage rights for the plurality of sub-accounts. In some embodiments, the user is able to simplify the interface by selecting a subset of usage rights/developer tools allowed by the token for a particular session. For example, the user selects only usage rights that are symmetrical between the plurality of sub-accounts, and server system 108 generates a limited web interface that is displayed by client device 104 of the user with buttons and affordances that correspond to the selected usage. In some embodiments, the user is able to further limit the usage rights or add some usage rights. Thereafter, server system 108 tweaks the limited interface to include usage rights/developer tools that correspond to the adjusted usage rights.

FIG. 4B, for example, shows client device 104 displaying a usage rights interface on touch screen 406 after server system 108 determines that the identity authentication process performed on the respective user account is successful. For example, the usage rights interface in FIG. 4B includes the usage rights 418 for the first sub-account 416 bound to the respective super account, usage rights 422 for the second sub-account 420 bound to the respective super account, and usage rights 426 for the third sub-account 424 bound to the respective super account. For example, the usage rights interface in FIG. 4B enables the user of client device 104 to limit the number of affordance shown in the home user interface for the unified account access application (e.g., the user interface in FIG. 4C) by disabling some of usage rights 418, 422, and 426 via slider affordances 417, 421, and 425, respectively.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 600, and process 700) are also applicable in an analogous manner to method 800 described above with respect to FIGS. 8A-8B.

Figure 9:
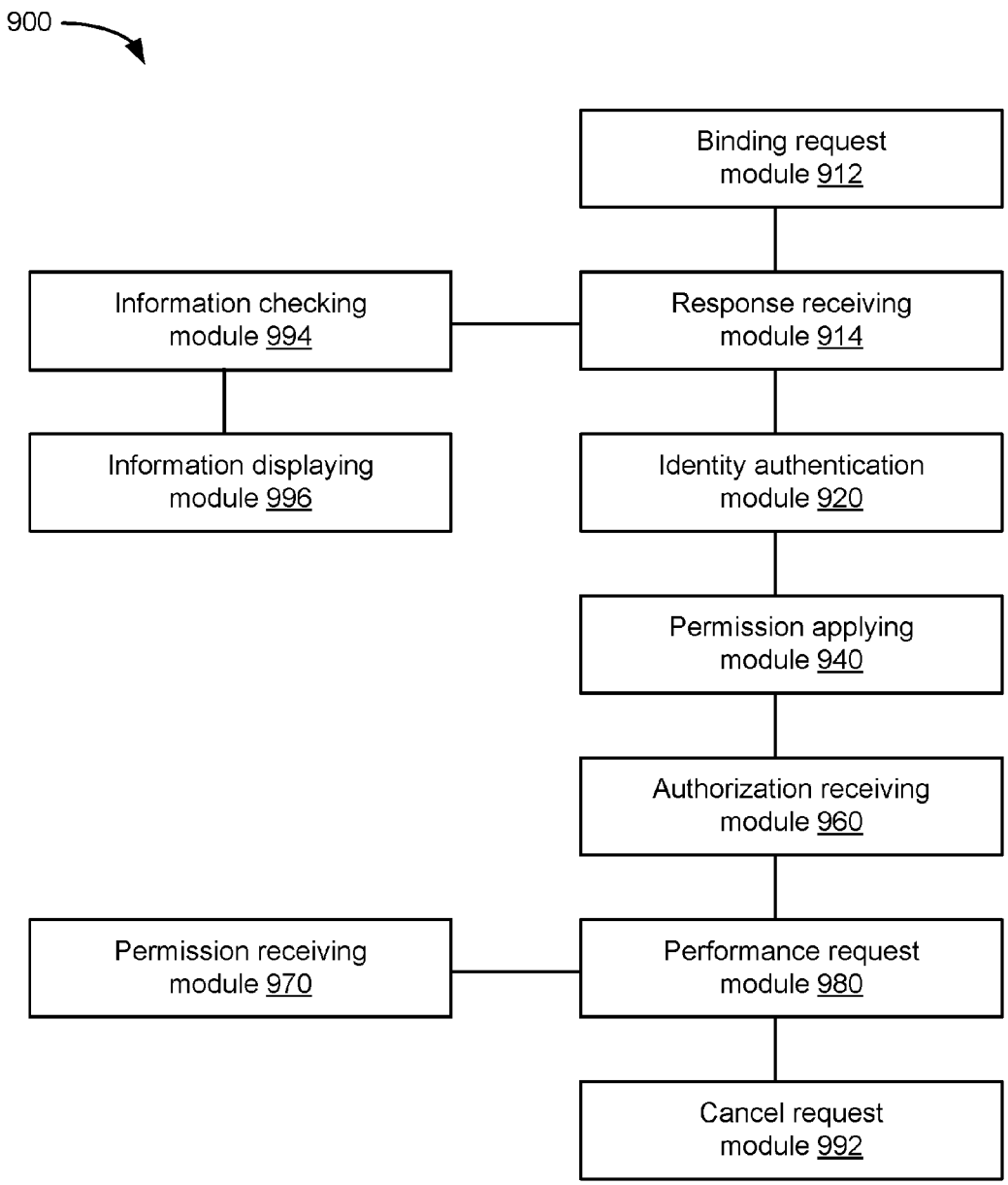
FIG. 9 is a block diagram of a client-side apparatus for multi-account verification in accordance with some embodiments.

FIG. 9 is a block diagram of a client-side apparatus 900 for multi-account verification in accordance with some embodiments. In some embodiments, client-side apparatus 900 may be implemented in whole or in part by software, hardware, or a combination thereof. For example, client-side apparatus 900 corresponds to client device 104 (FIGS. 1 and 3) or a component thereof (e.g., client-side module 102, FIGS. 1 and 3). In some embodiments, client-side apparatus 900 includes: identity authentication module 920, a permission applying module 940, an authorization receiving module 960, and an performance request module 980.

In some embodiments, identity authentication module 920 is configured to perform an identity authentication process to log into a super account.

In some embodiments, permission applying module 940 is configured to send a permissions request, to a server (e.g., server-side apparatus 1000, FIG. 10), for operating permission(s) for the at least one sub-account.

In some embodiments, authorization receiving module 960 is configured to receive, from the server, token(s) identifying the operating permission(s) for the at least one sub-account.

In some embodiments, performance request module 980 is configured to send a performance request, to the server, to perform an action corresponding to one of the operating permission(s) for the at least one sub-account.

In some embodiments, client-side apparatus 900 further includes: a binding request module 912, a response receiving module 914, a permission receiving module 970, a cancel request module 992, an information checking module 994, and an information displaying module 996.

In some embodiments, binding request module 912 is configured to send, to the server, a binding request to bind one or more sub-accounts to the super account.

In some embodiments, response receiving module 914 is configured to receive a binding success message, from the server, when the one or more sub-accounts are successfully bound to the super account.

In some embodiments, permission receiving module 970 is configured to receive an operating permission actively authorized by the server, where the operating permission is such permission that can be owned by the bound sub-account and is not authorized to the super account, which is detected by the server.

In some embodiments, cancel request module 992 is configured to send a permission cancel request, to the server, to cancel at least one of the operating permission(s) for the at least one sub-account.

In some embodiments, information checking module 994 is configured to send an information request, to the server, for the at least one sub-account.

In some embodiments, information displaying module 996 is configured to display the information for the at least one sub-account received in response to the information request.

Figure 10:
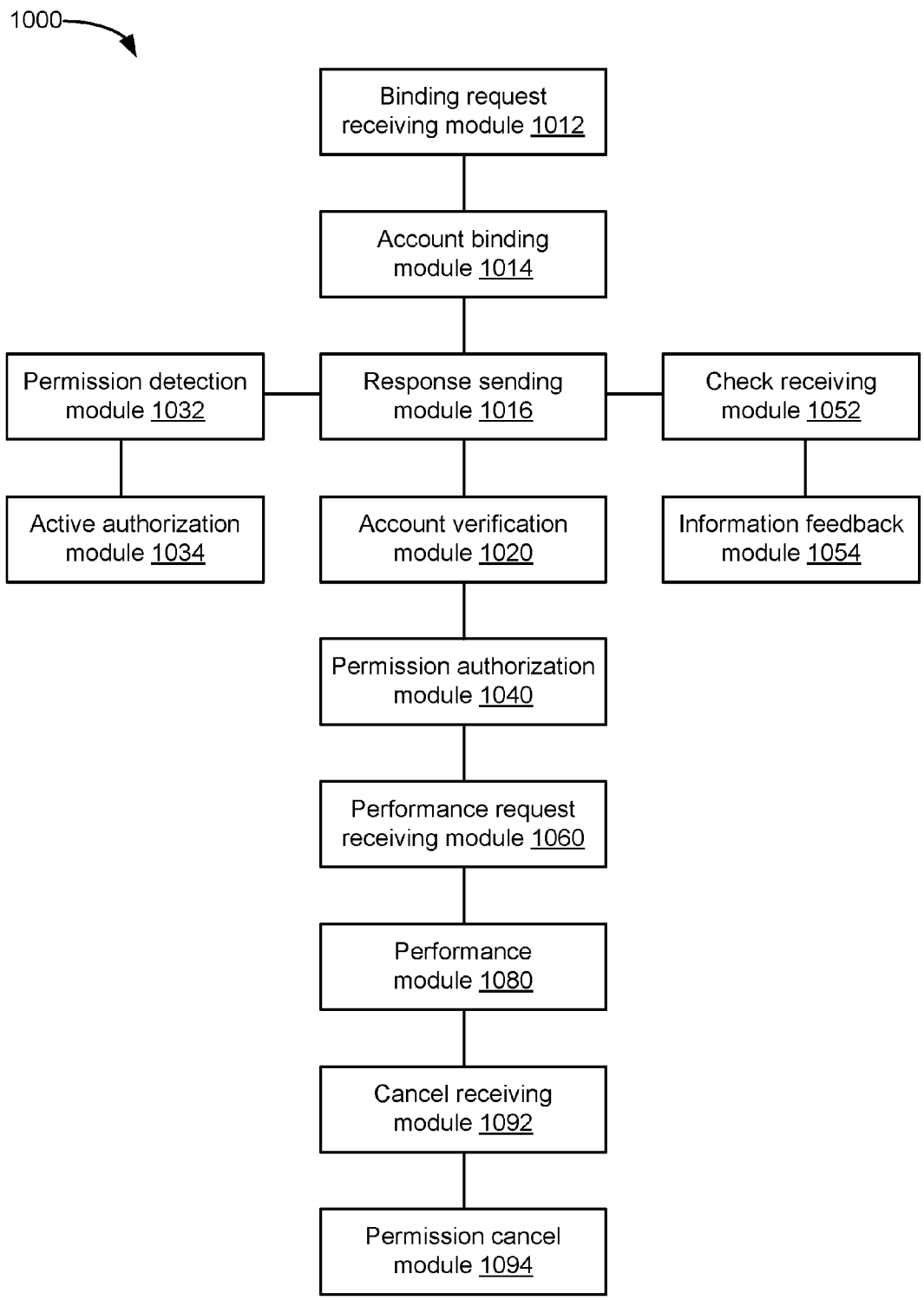
FIG. 10 is a block diagram of a server-side apparatus for multi-account verification in accordance with some embodiments.

FIG. 10 is a block diagram of a server-side apparatus 1000 for multi-account verification in accordance with some embodiments. In some embodiments, server-side apparatus 1000 may be implemented in whole or in part by software, hardware, or a combination thereof. For example, server-side apparatus 1000 corresponds to server system 108 (FIGS. 1-2) or a component thereof (e.g., server-side module 106, FIGS. 1-2). In some embodiments, server-side apparatus 1000 includes: an account verification module 1020, a permission authorization module 1040, a performance request receiving module 1060, and a performance module 1080.

In some embodiments, account verification module 1020 is configured to perform an identity authentication process to validate a super account, where the super account is bound with at least one sub-account, and each sub-account corresponds to a respective application platform.

In some embodiments, permission authorization module 1040 is configured to determine operating permission(s) for the at least one sub-account in response to receiving a permissions request and send token(s) identifying the operating permission(s) for the at least one sub-account.

In some embodiments, performance request receiving module 1060 is configured to receive a performance request, from a client device (e.g., client-side apparatus 900, FIG. 9), to perform an action corresponding to one of the operating permission(s) for the at least one sub-account.

In some embodiments, performance module 1080 is configured to processes the performance request so as to perform the action within the respective application platform corresponding to the at least one sub-account.

In some embodiments, server-side apparatus 1000 further includes: a binding receiving module 1012, an account binding module 1014, a response sending module 1016, a permission detection module 1032, an active authorization module 1034, a check receiving module 1052, an information feedback module 1054, a cancel receiving module 1092, and a permission cancel module 1094.

In some embodiments, binding receiving module 1012 is configured to receive, from the client device, a binding request to bind one or more sub-accounts to a super account.

In some embodiments, account binding module 1014 is configured to bind the one or more sub-accounts to the super account.

In some embodiments, response sending module 1016 is configured to send, to the client device, a binding success message when the one or more sub-accounts are successfully bound to the super account.

In some embodiments, permission detection module 1032 is configured to detect whether a bound sub-account has an operating permission authorized to the super account, where the operating permission can be owned only after the identity authentication process of the sub-account is passed.

In some embodiments, active authorization module 1034 is configured to actively authorize the operating permission to the super account if the detection result is that the sub-account owns the operating permission, which is not authorized to the super account.

In some embodiments, check receiving module 1052 is configured to receive, from the client device, an information request for the at least one sub-account.

In some embodiments, information feedback module 1054 is configured to process the information request to identify information for the at least one sub-account, and send the identified information for the at least one sub-account.

In some embodiments, cancel receiving module 1092 is configured to receive, from the client device, a permission cancel request to cancel at least one of the operating permission(s) for the at least one sub-account.

In some embodiments, check permission cancel module 1094 is configured to process the permission cancel request to cancel the at least operating permission for the at least one sub-account.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of facilitating collaboration across a plurality of platforms, the method comprising:
   at a server with one or more processors and memory:
      performing an identity authentication process to validate a user to access super account, wherein the super account is bound to a plurality of sub-accounts, and wherein each of the plurality of sub-accounts corresponds to a distinct platform;
      in accordance with a determination that the identity authentication process is successful, querying sub-servers corresponding to the plurality of sub-accounts for respective usage rights of each of the plurality of sub-accounts;
      transmitting, to the user, one or more tokens identifying the respective usage rights of each of the plurality of sub-accounts;
      generating a user interface including affordances based at least in part on the usage rights of each of the plurality of sub-accounts, wherein the user interface includes a plurality of developer environments for the platforms corresponding to the sub-accounts concurrently displayed in separate windows; and
      providing a file transfer function to transfer files between the windows corresponding to the plurality of developer environments.

2. The method of claim 1, further comprising:
   prior to generating the user interface, querying the sub-servers corresponding to the plurality of sub-accounts for files corresponding to the plurality of sub-accounts; and
   including a unified file manager for the files corresponding to the plurality of sub-accounts in the user interface, wherein the unified file manager enables the user to perform one or more of reading, sharing, moving, editing, and deleting the files corresponding to the plurality of sub-accounts.

3. The method of claim 1, further comprising:
   prior to generating the user interface, querying the sub-servers corresponding to the plurality of sub-accounts for messages corresponding to the plurality of sub-accounts; and
   including a unified message manager for the messages corresponding to the plurality of sub-accounts in the user interface, wherein the unified message manager enables the user to send messages within the plurality of sub-accounts and read messages corresponding to the plurality of sub-accounts.

4. The method of claim 1, wherein the user interface includes the usage rights for each of the plurality of sub-accounts, and the method further includes:
   receiving a notification from the user selecting a subset of the usage rights for the plurality of sub-accounts; and
   generating a limited user interface that includes development tools for the plurality of sub-accounts based on the selected subset of the usage rights for the plurality of sub-accounts.

5. A method of facilitating collaboration across a plurality of platforms, the method comprising:
   at a server with one or more processors and memory:
      performing an identity authentication process to validate a user to access super account, wherein the super account is bound to a plurality of sub-accounts, and wherein each of the plurality of sub-accounts corresponds to a distinct platform;
      in accordance with a determination that the identity authentication process is successful, querying sub-servers corresponding to the plurality of sub-accounts for respective usage rights of each of the plurality of sub-accounts;

transmitting, to the user, one or more tokens identifying the respective usage rights of each of the plurality of sub-accounts;

generating a user interface including affordances based at least in part on the usage rights of each of the plurality of sub-accounts, wherein the user interface includes a plurality of developer environments for the platforms corresponding to the sub-accounts concurrently displayed in separate windows; and providing an object sharing function to share at least one of bug reports, test results, and test plans between the windows corresponding to the plurality of developer environments.

6. The method of claim 5, further comprising:

prior to generating the user interface, querying the sub-servers corresponding to the plurality of sub-accounts for files corresponding to the plurality of sub-accounts; and including a unified file manager for the files corresponding to the plurality of sub-accounts in the user interface, wherein the unified file manager enables the user to perform one or more of reading, sharing, moving, editing, and deleting the files corresponding to the plurality of sub-accounts.

7. The method of claim 5, further comprising:

prior to generating the user interface, querying the sub-servers corresponding to the plurality of sub-accounts for messages corresponding to the plurality of sub-accounts; and including a unified message manager for the messages corresponding to the plurality of sub-accounts in the user interface, wherein the unified message manager enables the user to send messages within the plurality of sub-accounts and read messages corresponding to the plurality of sub-accounts.

8. The method of claim 5, wherein the user interface includes the usage rights for each of the plurality of sub-accounts, and the method further includes:

receiving a notification from the user selecting a subset of the usage rights for the plurality of sub-accounts; and generating a limited user interface that includes development tools for the plurality of sub-accounts based on the selected subset of the usage rights for the plurality of sub-accounts.

9. A server, comprising:

one or more processors; and memory storing one or more programs to be executed by the one or more processors, the one or more programs comprising instructions for:

performing an identity authentication process to validate a user to access a super account, wherein the super account is bound to a plurality of sub-accounts, and wherein each of the plurality of sub-accounts corresponds to a distinct platform;

in accordance with a determination that the identity authentication process is successful, querying sub-servers corresponding to the plurality of sub-accounts for respective usage rights of each of the plurality of sub-accounts;

transmitting, to the user, one or more tokens identifying the respective usage rights of each of the plurality of sub-accounts;

generating a user interface including affordances based at least in part on the usage rights of each of the plurality of sub-accounts, wherein the user interface includes a plurality of developer environments for the platforms corresponding to the sub-accounts concurrently displayed in separate windows; and providing a file transfer function to transfer files between the windows corresponding to the plurality of developer environments.

10. The server of claim 9, wherein the one or more programs further comprise instructions for:

providing an object sharing function to share at least one of bug reports, test results, and test plans between the windows corresponding to the plurality of developer environments.

11. The server of claim 9, wherein the one or more programs further comprise instructions for:

prior to generating the user interface, querying the sub-servers corresponding to the plurality of sub-accounts for files corresponding to the plurality of sub-accounts; and including a unified file manager for the files corresponding to the plurality of sub-accounts in the user interface, wherein the unified file manager enables the user to perform one or more of reading, sharing, moving, editing, and deleting the files corresponding to the plurality of sub-accounts.

12. The server of claim 9, wherein the one or more programs further comprise instructions for:

prior to generating the user interface, querying the sub-servers corresponding to the plurality of sub-accounts for messages corresponding to the plurality of sub-accounts; and including a unified message manager for the messages corresponding to the plurality of sub-accounts in the user interface, wherein the unified message manager enables the user to send messages within the plurality of sub-accounts and read messages corresponding to the plurality of sub-accounts.

13. The server of claim 9, wherein the user interface includes the usage rights for each of the plurality of sub-accounts, and wherein the one or more programs further comprise instructions for:

receiving a notification from the user selecting a subset of the usage rights for the plurality of sub-accounts; and generating a limited user interface that includes development tools for the plurality of sub-accounts based on the selected subset of the usage rights for the plurality of sub-accounts.

14. A non-transitory computer readable storage medium storing one or more programs, the one or more programs comprising instructions, which, when executed by a server with one or more processors, cause the server to perform operations comprising:

performing an identity authentication process to validate a user to access a super account, wherein the super account is bound to a plurality of sub-accounts, and wherein each of the plurality of sub-accounts corresponds to a distinct platform;

in accordance with a determination that the identity authentication process is successful, querying sub-servers corresponding to the plurality of sub-accounts for respective usage rights of each of the plurality of sub-accounts;

transmitting, to the user, one or more tokens identifying the respective usage rights of each of the plurality of sub-accounts;

generating a user interface including affordances based at least in part on the usage rights of each of the plurality of sub-accounts, wherein the user interface includes a plurality of developer environments for the platforms corresponding to the sub-accounts concurrently displayed in separate windows; and providing a file transfer function to transfer files between the windows corresponding to the plurality of developer environments.

15. The non-transitory computer readable storage medium of claim 14, wherein the instructions cause the server to perform operations further comprising:

providing an object sharing function to share at least one of bug reports, test results, and test plans between the windows corresponding to the plurality of developer environments.

16. The non-transitory computer readable storage medium of claim 14, wherein the instructions cause the server to perform operations further comprising:

prior to generating the user interface, querying the sub-servers corresponding to the plurality of sub-accounts for files corresponding to the plurality of sub-accounts; and including a unified file manager for the files corresponding to the plurality of sub-accounts in the user interface, wherein the unified file manager enables the user to perform one or more of reading, sharing, moving, editing, and deleting the files corresponding to the plurality of sub-accounts.

17. The non-transitory computer readable storage medium of claim 14, wherein the instructions cause the server to perform operations further comprising:

prior to generating the user interface, querying the sub-servers corresponding to the plurality of sub-accounts for messages corresponding to the plurality of sub-accounts; and including a unified message manager for the messages corresponding to the plurality of sub-accounts in the user interface, wherein the unified message manager enables the user to send messages within the plurality of sub-accounts and read messages corresponding to the plurality of sub-accounts.

* * * * *